United States Patent [19]

Kutaragi

[11] Patent Number: 5,257,254
[45] Date of Patent: Oct. 26, 1993

[54] APPARATUS FOR CONTROLLING CD AUDIO PLAYER TO PLAYBACK CD-ROM

[75] Inventor: Ken Kutaragi, Kanagawa, Japan

[73] Assignee: Sony Corporation, Tokyo, Japan

[21] Appl. No.: 633,327

[22] Filed: Dec. 24, 1990

[30] Foreign Application Priority Data

Dec. 29, 1989 [JP] Japan .................. 1-341956
Dec. 29, 1989 [JP] Japan .................. 1-341958
Dec. 29, 1989 [JP] Japan .................. 1-341959
Dec. 29, 1989 [JP] Japan .................. 1-341968
Jan. 22, 1990 [JP] Japan .................. 2-012067

[51] Int. Cl.$^5$ .............................................. G11B 5/09
[52] U.S. Cl. ........................................ 369/50; 369/1; 369/32; 369/47; 360/14.1; 360/14.2; 360/14.3; 360/78.02
[58] Field of Search .............. 369/47, 50, 32, 01; 360/14.1, 14.2, 14.3, 78.02

[56] References Cited

U.S. PATENT DOCUMENTS 4,719,611  1/1988  Miura et al. ................. 369/47
4,876,719 10/1989  Nakagami et al. ........... 369/1

FOREIGN PATENT DOCUMENTS 0289625 11/1987 European Pat. Off. .
2544536  4/1983 France .
WO8304463 9/1982 World Int. Prop. O. .
WO8810491 6/1987 World Int. Prop. O. .

Primary Examiner—Robert J. Pascal
Assistant Examiner—R. A. Ratliff
Attorney, Agent, or Firm—Lewis H. Eslinger; Jay H. Maioli

[57] ABSTRACT

A data reproducing apparatus includes a reproducing section for reproducing digital data and whose reproducing state is controlled by a signal transmitted in a wireless fashion to thereby output reproduced data as digital data, and a control section for transmitting a reproducing position information to the reproducing section in a wireless fashion and decoding the digital data from the reproducing section such that, when it is determined that the data is necessary data, the data is stored in the control section, wherein a track number information near the position in which the necessary data is recorded is transmitted from the control section to the reproducing section through a wireless signal to thereby reproduce the necessary data.

6 Claims, 11 Drawing Sheets

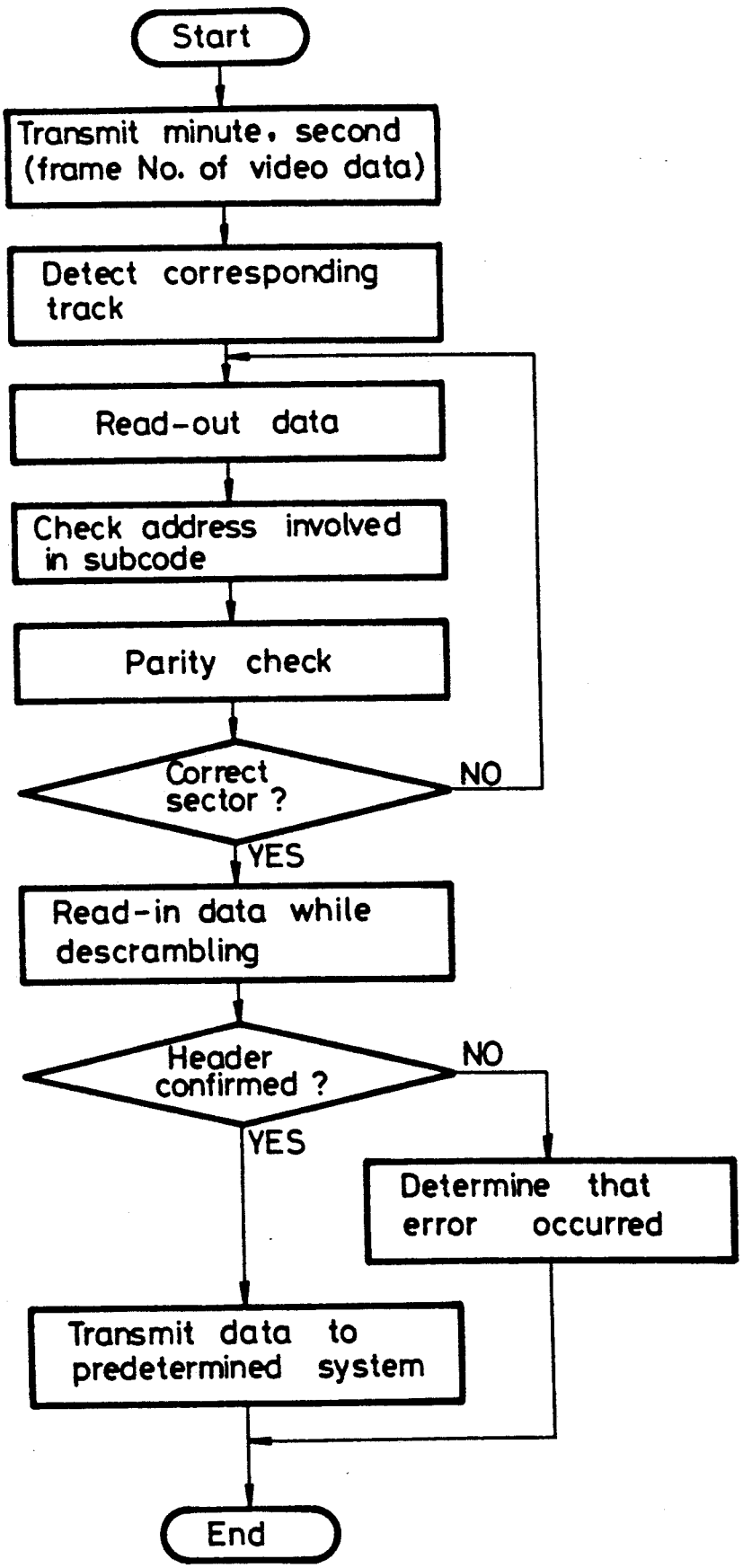

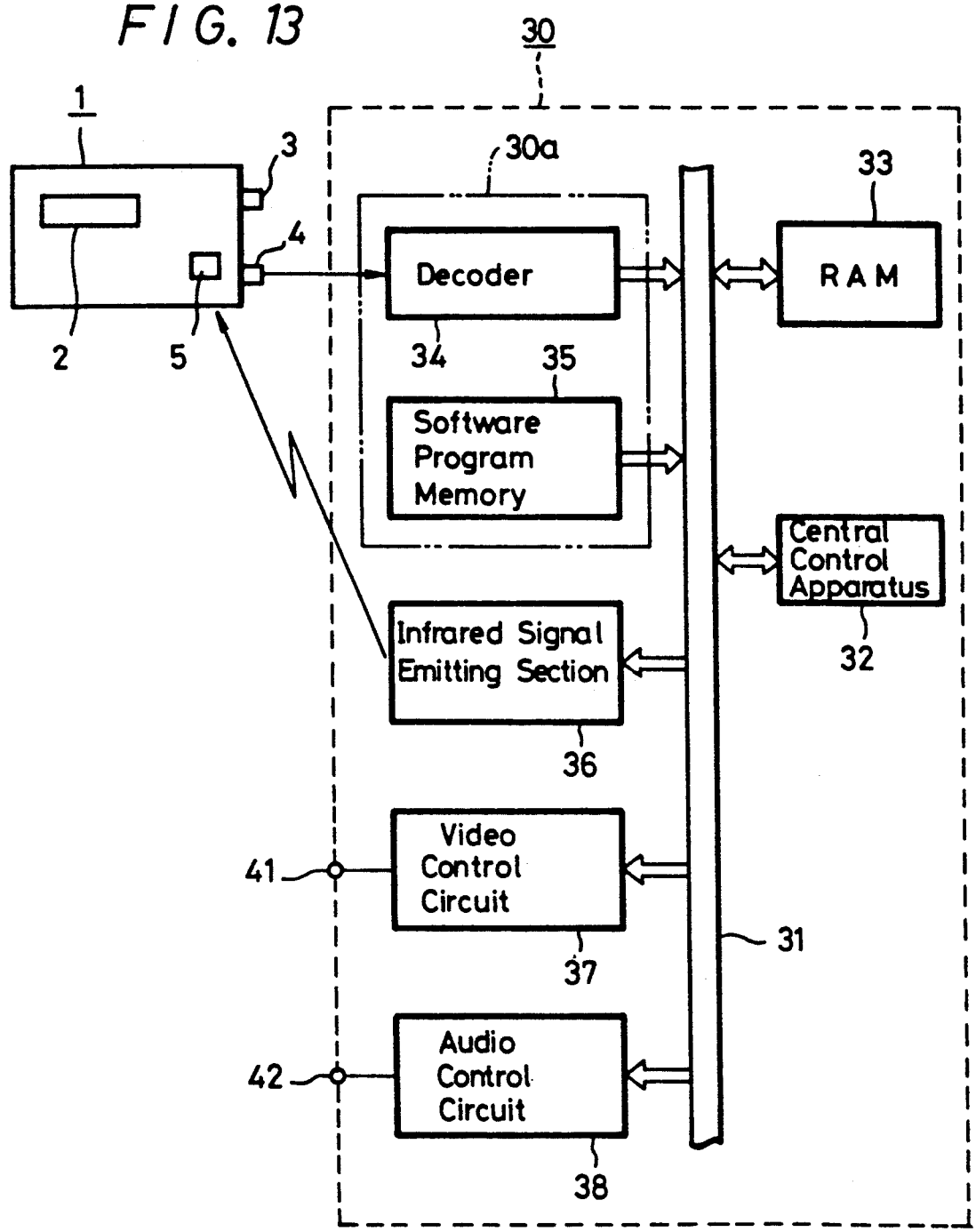

APPARATUS FOR CONTROLLING CD AUDIO PLAYER TO PLAYBACK CD-ROM

BACKGROUND OF THE INVENTION

1. Field of the Invention

The present invention relates generally to a data reproducing apparatus suitable for use in a CD (compact disc) recording and reproducing apparatus which records and reproduces, for example, a digital audio signal. More particularly, this invention relates to a digital data recording disc control method which is suitably applied to a digital data recording disc called a CD ROM (read only memory).

2. Description of the Prior Art

Conventionally, a CD ROM apparatus has been developed as a digital data reproducing apparatus for program data and so on for computers. This CD ROM apparatus is adapted to record a variety of digital data such as program data and so on on a disc with a similar standard to that of a compact disc on which a digital audio signal is recorded and is used as a read only memory (ROM). The CD ROM apparatus is composed of a disk-shaped CD ROM having predetermined data stored therein and a disc drive apparatus as a data reproducing apparatus. According to this CD ROM apparatus, it is possible to store an extremely large amount of data.

However, this CD ROM apparatus requires an exclusive disc drive apparatus in addition to a CD player for reproducing a digital audio signal. The CD ROM apparatus is constructed so as to enable a high speed access to an arbitrary track such that necessary data can be promptly taken out, and is generally expensive compared with the relatively inexpensive CD reproducing apparatus for reproducing a digital audio signal.

OBJECTS AND SUMMARY OF THE INVENTION

Accordingly, it is an object of the present invention to provide an improved data reproducing apparatus in which the aforenoted shortcomings and disadvantages of the prior art can be eliminated.

More specifically, it is an object of the present invention to provide a data reproducing apparatus in which necessary data can be read out at a speed equal to or higher than that of an exclusive digital data reproducing apparatus.

It is another object of the present invention to provide a data reproducing apparatus in which various reproducing apparatus such as a digital audio signal reproducing CD (compact disc) player and so on can be utilized as a digital data reproducing apparatus which reproduces computer program data or the like.

According to an aspect of the present invention, a data reproducing apparatus is comprised of a reproducing section for reproducing digital data and whose reproducing state is controlled by a signal transmitted in a wireless fashion to thereby output reproduced data as digital data, and a control section for transmitting a reproducing position information to the reproducing section in a wireless fashion and decoding the digital data from the reproducing section such that, when it is determined that the data is necessary data, the data is stored in the control section, wherein a track number information near the position in which the necessary data is recorded is transmitted from the control section to the reproducing section by a wireless signal to thereby reproduce the necessary data.

The preceding, and other objects, features and advantages of the present invention will be apparent in the following detailed description of preferred embodiments to be read in conjunction with the accompanying drawings, in which like reference numerals are used to identify the same or similar parts in the several views.

BRIEF DESCRIPTION OF THE DRAWINGS

FIG. 12 is a flowchart to which references will be made in explaining an operation of the fifth embodiment; and FIG. 13 is a block diagram showing a seventh embodiment of the data reproducing apparatus according to the present invention.

DETAILED DESCRIPTION OF THE PREFERRED EMBODIMENTS

The present invention will hereinafter be described in detail with reference to the drawings.

Figure 1:
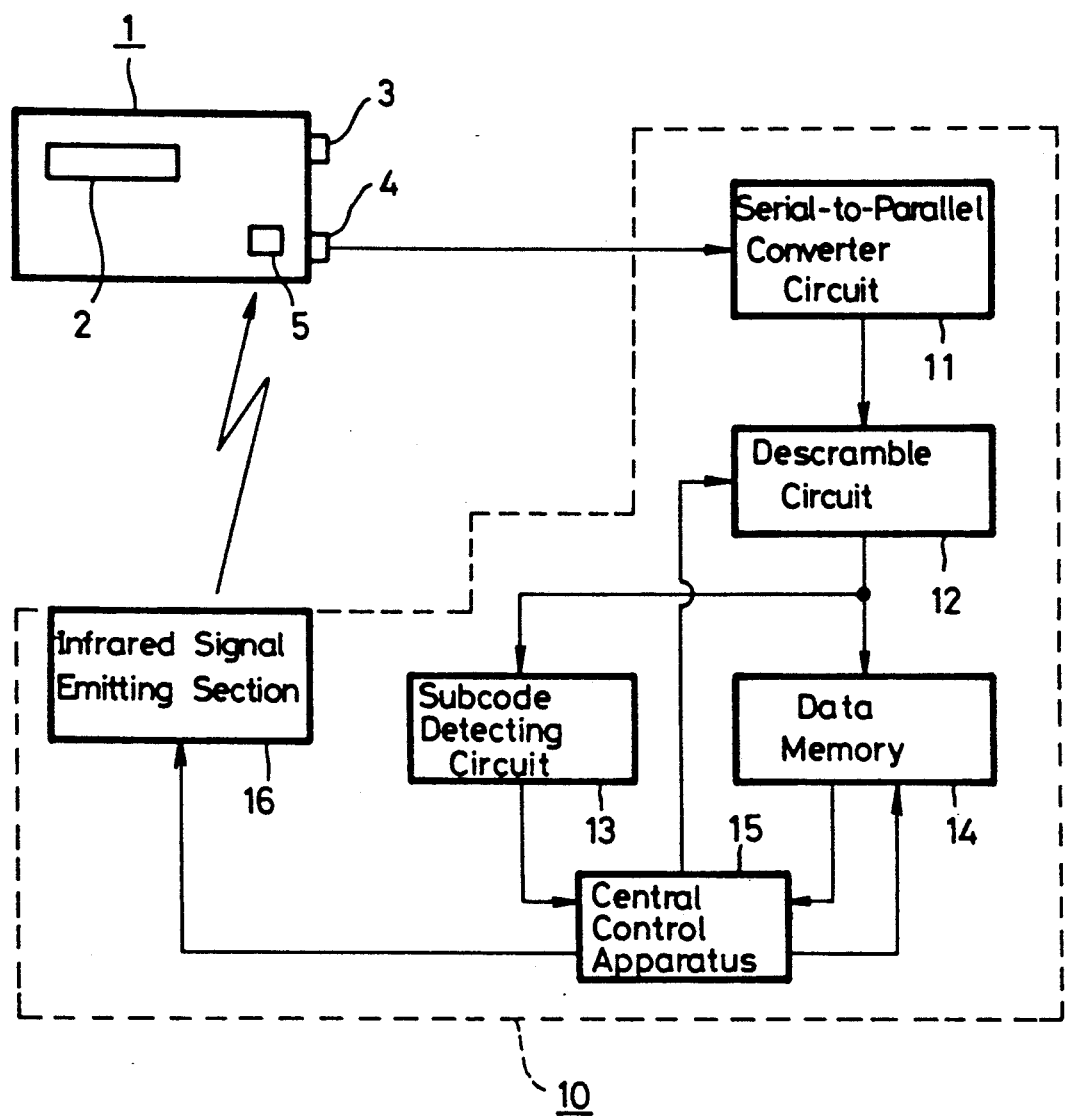
FIG. 1 is a schematic block diagram showing a first embodiment of a data reproducing apparatus according to the present invention.

In FIG. 1, which shows a first embodiment of the present invention, reference numeral 1 designates a CD player, and this CD player 1 is adapted to reproduce a CD on which a digital audio signal has been recorded, wherein a digital audio signal reproduced from a CD carried on a CD holder 2 is converted to an analog audio signal which is output from an analog audio signal output terminal 3, and the audio signal is reproduced from a speaker of an audio equipment (not shown) connected to this CD player 1. Also, this CD player 1 is provided with a digital signal output terminal 4, such that a digital signal reproduced from the CD is directly output from this digital signal output terminal 4. For example, by connecting this digital signal output terminal 4 with an audio equipment provided with a digital signal input terminal, an audio signal in the form of a digital signal is transmitted its to the amplifier side, to thereby suppress deterioration in reproduced sound quality to a minimum.

This CD player 1 is provided with an infrared ray signal receiving section 5 such that a variety of reproducing controls can be performed by receiving an infrared ray signal emitted from a remote commander (not shown). That is, a variety of controls, such as an indication of a reproduction start position, a pause, a fast forward, a playback stop and so on can be performed by a track number and an index number. For example, it is constructed in a manner that a reproduced track number is indicated by an infrared ray signal from the remote commander to start reproduction of music on the indicated track. In this case, when a reproduction start position has been indicated by a track number the and an index number, information of a track named TOC (Table of Contents) in the innermost periphery of a disc is read, address positions of the indicated track number and index number are determined, an optical pickup head is moved to the address positions of the track number and index number, and the location of the indicated track number and index number is reproduced.

Figure 2:
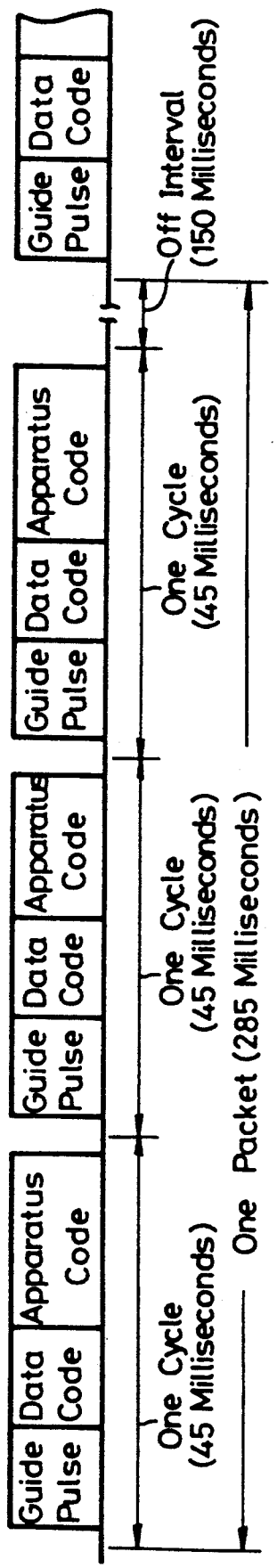
FIG. 2 is a schematic diagram of an arrangement of information in an example of an infrared ray signal, and to which reference will be made in explaining the present invention.

FIG. 2 shows an example of the infrared ray signal output from the remote commander.

As shown in FIG. 2, assuming that a sequence of infrared ray signals output by an operation is one packet, this one packet has one cycle of 45 milliseconds which is repeated three times and an off-interval is composed of 150 milliseconds. In each cycle, a guide pulse (a synchronizing signal), a data code and an apparatus code are output, and the same signals are output in each cycle. In this case, a CD player is indicated by the apparatus code, and a variety of control data such as the track number, the index number and so on are transmitted by the data code.

In this embodiment, the digital signal output terminal 4 of this CD player 1 is connected to a CD ROM control apparatus 10, and the CD player 1 and the CD ROM control apparatus 10 constitute a CD ROM drive apparatus. This CD ROM control apparatus 10 supplies a digital signal output from the digital signal output terminal 4 of the CD player 1 to its serial-to-parallel (S/P) converter 11, and digital serial data reproduced from a disk is converted to parallel data by this serial-to-parallel converter 11.

The thus converted parallel data is supplied to a descramble circuit 12. In the descramble circuit 12, reproduced data is descrambled on the basis of a control of a central control apparatus 15, and the descrambled reproduced data is supplied to a subcode detecting circuit 13 and a data memory 14. In the subcode detecting circuit 13, subcode information is detected from reproduced data supplied thereto, and the detected subcode information is supplied to the central control apparatus 15 formed of a microcomputer. Also, the condition that reproduced data is stored in the data memory 14 is controlled by the central control apparatus 15, and stored data is supplied to this central control apparatus 15. Further, the central control apparatus 15 is connected with an infrared ray signal emitting section 16, and a predetermined infrared ray signal is output from this infrared signal emitting section 16 under the control of the central control apparatus 15. In this case, the infrared ray signal emitting section 16 is placed at a position from which an emitted infrared ray signal reaches the infrared ray signal receiving section 5 of the above-mentioned CD player 1, and from the infrared ray signal emitting section 16 of this CD ROM control apparatus 10, control signals such as a track number indicating a track to be reproduced from a disc, an index number and so on, are output in a condition as shown in FIG. 2.

Predetermined data stored in the data memory 14 of the CD ROM control apparatus 10 is supplied to a predetermined data processing apparatus (not shown) for performing a variety of data processing.

By the above construction, the CD player 1 and the CD ROM control apparatus 10 function as a CD ROM drive apparatus by placing a CD ROM on which necessary data is recorded on the disc holder 2 of the CD player 1.

An operation of this embodiment in which the present invention is utilized as the CD ROM drive apparatus will be described hereinafter.

A data recording mode of the CD ROM will be described first. Since a CD ROM has a very large data recording capacity, a plurality of data may be recorded, wherein each data is recorded in a region corresponding to a digital audio data recording area on a CD in a similar block format to digital audio data. More specifically, showing an example of a recording format of the CD ROM in FIG. 3, data is divided into a plurality of blocks and recorded, and 75 blocks are formed on a recording track of a one-second portion. One second in this case corresponds to the length of a one-second portion of a recording track in the case of recording digital audio signal as data. Each block is formed of 2352 bytes, wherein in each block first 12 bytes are assigned to a synchronizing signal, and the next four bytes are assigned to a header. In this header, address information (minute, second, sector) of a recording sector and recording mode information are recorded. The next 2048 bytes are assigned to an arbitrary data recording area, four bytes subsequent to this data recording area are assigned to an error detecting code, the next eight bytes are assigned to a space, and thereafter, the last four bytes are assigned to an error correcting code. Incidentally, data except for the synchronizing signal in each block is descrambled in a predetermined manner and recorded. First predetermined bytes including the header are called the subcode, and address information included in this subcode enables a search as will be described later. The address information included in this subcode is constructed in a similar manner to the case of a CD on which a digital audio signal is recorded as data.

In this example, track numbers are assigned to recording tracks of a CD ROM at predetermined intervals (not limited to equal intervals), and if necessary, an index number is assigned to each track number at a predetermined location of the track, wherein address information on the track numbers is recorded on a track referred to as TOC in the innermost periphery.

An operation of reading out data thus recorded on a CD ROM will be explained with reference to a flowchart forming FIG. 4.

First, record address information for each data is recorded on a predetermined track on a CD ROM or on a separate floppy disk, and the central control apparatus 15 for controlling read-out operation of the CD ROM judges this data record address information, indicates an address of necessary data, and has the necessary data read out. That is, by the central control apparatus 15 of the CD ROM control apparatus 10, when predetermined data is required to be read from a CD ROM loaded on the CD players 1, an address position at which this data has been recorded is determined. Since the CD player 1 of this embodiment can indicate reproduction start position by means of the track number and index number, an information of the track number and the index number including an address at which each data has been recorded is included in record address information for each data.

Figure 4:
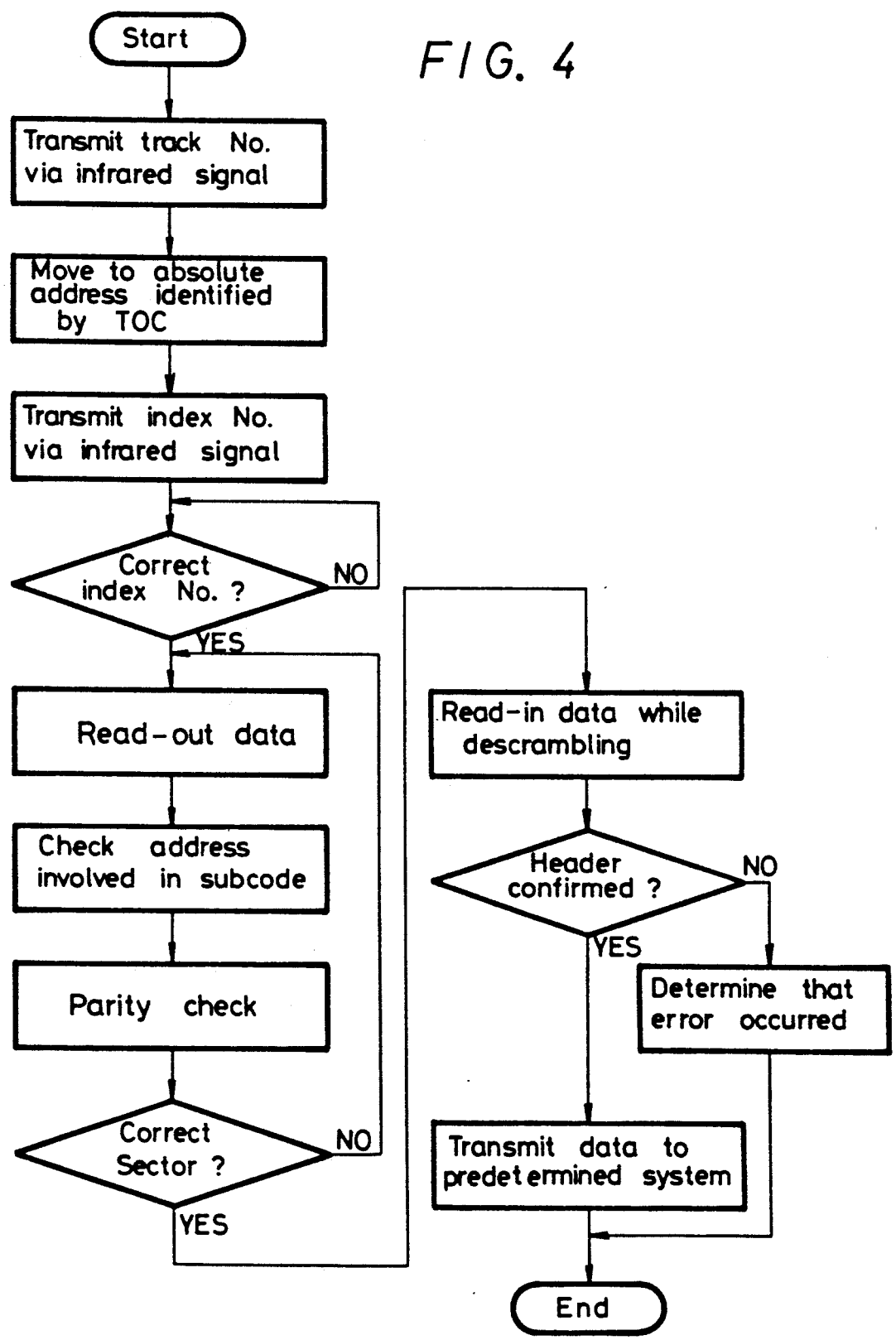
FIG. 4 is a flowchart to which references will be made in explaining an operation of the first embodiment of the present invention.

When the track number and index number have been determined, track number data is output from the infrared ray signal emitting section 16 under instruction of the central control apparatus 15 as shown in the flowchart of FIG. 4. When the infrared ray signal receiving section 5 of the CD player 1 receives this track number data, a control section of this CD player 1 moves the optical pickup head to the address of a track number indicated on the basis of address information on the track number recorded on the TOC track. If it is necessary to indicate an index number, index number data is subsequently output from the infrared ray signal emitting section 16. When the infrared ray signal receiving section 5 of the CD player 1 receives this index number data, CD player 1 searches a track of a number at which the optical pickup head is currently positioned, the number of index signals is counted, it is determined whether or not the counted value coincides with an indicated value of an index number, and the search repeated until this counted value coincides. When the counted value has coincided, it is determined to be the concerned index number, and the location of this index number is reproduced.

When the location of the indicated track number and index number is thus reproduced, all reproduced digital data is output from the digital signal output terminal 4 of the CD player 1, and the CD ROM control apparatus 10 is supplied with the reproduced digital data. In this CD ROM control apparatus 10, subcode information is detected from the reproduced digital data by the subcode detecting circuit 13, the detected subcode information is supplied to the central control apparatus 15, and the address of the reproduced location is checked by address information included in this subcode information. Simultaneously, a parity check is also performed. Then, it is determined whether or not the detected address of the reproduced location is the recording address (sector) of necessary data. At this time, if it is not the address of the concerned sector, reproduction is continued until the address of the concerned sector is detected. Incidentally, if a fast forward reproduction can be indicated by an infrared ray signal, this fast forward reproduction can be indicated to skip so as to promptly reach the address at which necessary data has been recorded.

When the address of a sector on which necessary data has been recorded is detected, reproduced data at that time is descrambled by the descramble circuit 12 and stored in the data memory 14 under the control of the central control apparatus 15. The header of the read data is verified, and when verified, it is judged that data read has been correctly performed. This data is supplied to a predetermined data processing apparatus (not shown) under the control of the central control apparatus 15, and a predetermined operation is performed based on the read data. When the data read has been correctly performed, a stop of a reproducing operation is indicated to the CD player 1 by an infrared ray signal to stop the reproducing operation. Whereas, when the header of the read data has not been verified, it is judged that the data read has not been correctly performed, and the operation is repeated from the indication of the track number and the index number by transmitting again the infrared ray signal. When the reading of data cannot be correctly performed with this control operation repeated a plurality of times, an occurrence of trouble is displayed.

Thus, according to this embodiment, data can be read from a CD ROM by the use of the CD player 1 for reproducing a digital audio signal. In this case, since necessary data recording area is searched by the use of a search function for the track number and the index number by an infrared ray signal from a remote commander provided for the ordinary CD player 1, a special search function for data read is not necessary, whereby a variety of CD players available on the market can be used as a disk drive apparatus for the CD ROM apparatus.

Incidentally, in the above-mentioned embodiment, an example of using a CD player having a search function for the track number and the index number has been explained. However, in the case of using a CD player capable of directly indicating an absolute reproducing position in minute, second and sector by an infrared ray signal, as the CD player 1, a location at which necessary data has been recorded may be immediately reproduced by outputting an infrared ray signal for indicating an address in minute, second and sector indicative of the location at which the necessary data has been recorded directly from the infrared ray signal emitting section 16 of the CD ROM control apparatus 10.

Figure 5:
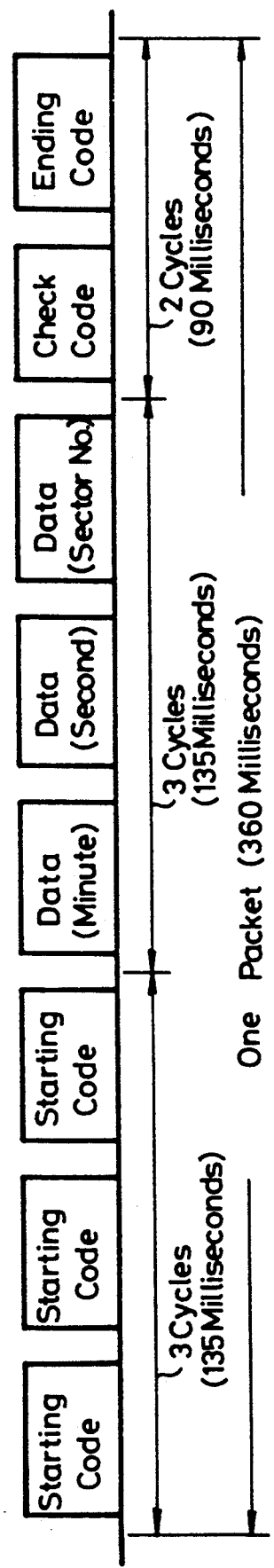
FIG. 5 is a schematic diagram of an arrangement of another example of the infrared ray signal, and to which reference will be made in explaining an operation of a second embodiment of the present invention.

More specifically, as shown in FIG. 5, in the infrared ray signal output from the infrared ray signal emitting section 16 of the CD ROM control apparatus 10, one packet is composed of eight cycles (one cycle is 45 milliseconds), wherein a starting code is transmitted in the first three cycles, data indicative of minute, second and sector are transmitted at each cycle of the next three cycles, and a check code and an end code are transmitted in the last two cycles. When the infrared ray signal receiving section 5 of the CD player 1 receives this infrared ray signal, a control section of this CD player 1 directly moves the optical pickup head to the address position indicated by the infrared ray signal, and the location indicated by the track number and the index number is reproduced. In this case, it is possible to judge whether or not a control has been correctly performed by judging subcode information in reproduced data by the central control apparatus 15 of the CD ROM control apparatus 10. Incidentally, if the subcode information in the reproduced data can be output from the digital signal output terminal 4 even during a search for an indicated track, and if this reproduced data in course of search is judged by this central control apparatus 15 of the CD ROM control apparatus 10, a highly accurate disk reproducing control operation can be performed from the side of the CD ROM control apparatus 10. By this construction, a time for searching a location at which necessary data has been recorded can be reduced.

Also, in the above-described embodiment, a CD ROM apparatus is used, however, it is applicable to a ROM apparatus using a digital audio signal recording area of a video disk. In this case, a video disk player provided with a digital audio signal output terminal may be connected to the CD ROM control apparatus 10 instead of a CD player. Further, other digital signal reproducing apparatus such as a digital audio tape recorder and so on may be used.

According to the above embodiment of the present invention, a variety of reproducing apparatus such as a CD player for reproducing a digital audio signal, the reproducing condition of which can be controlled by wirelessly transmitting an infrared ray signal or the like, can be used as a digital data reproducing apparatus for program data for a computer and so on, and a digital data reproducing apparatus can be constructed by using existing apparatus at a low cost. In this case, by wirelessly transmitting information on an absolute position at which necessary data has been recorded to a reproducing section and reproducing the necessary data, the necessary data can be immediately derived, whereby a high speed data read can be achieved which bears comparison with the exclusive digital data reproducing apparatus.

Figure 6:
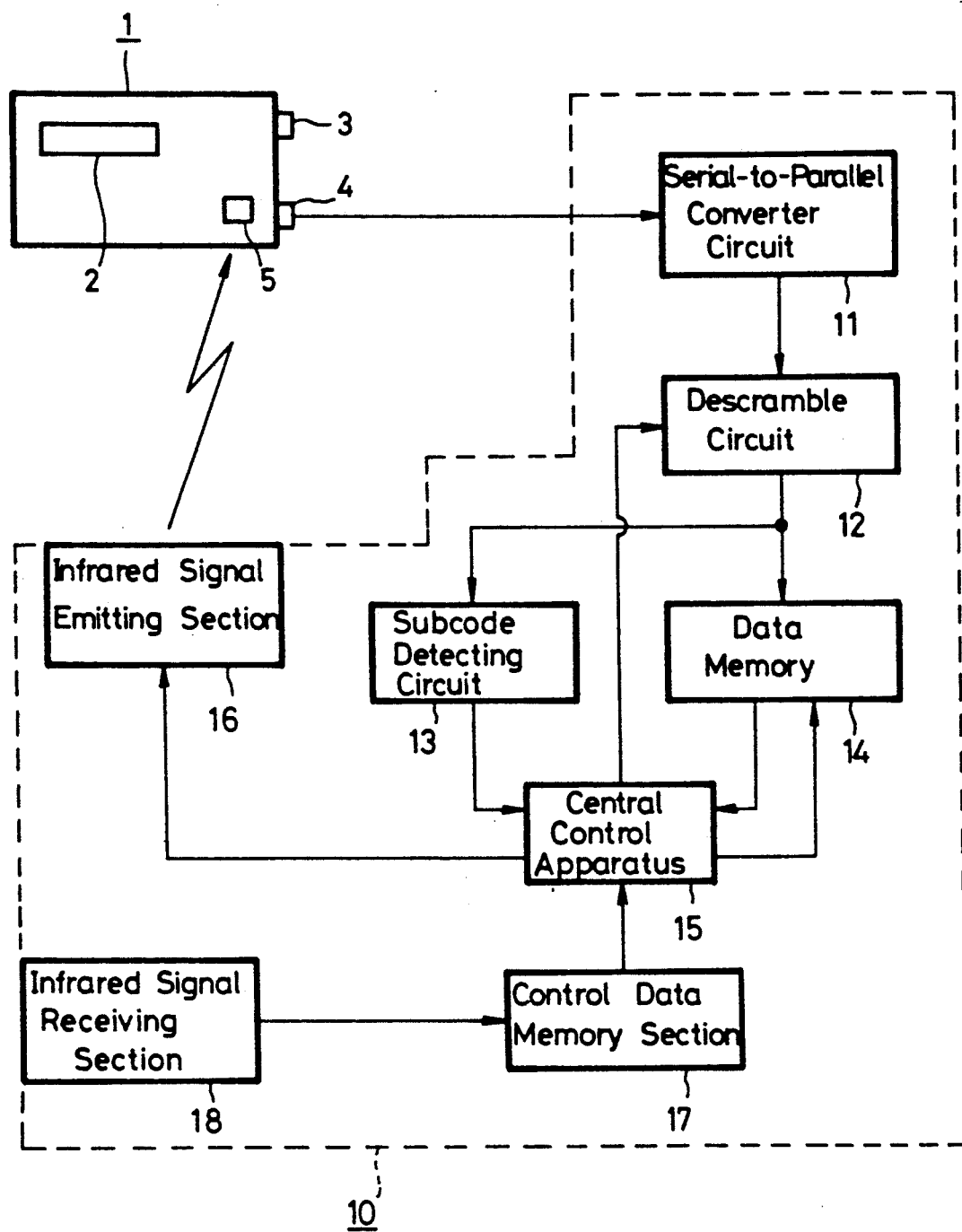
FIG. 6 is a block diagram showing a third embodiment of the data reproducing apparatus according to the present invention.

A third embodiment of the data reproducing apparatus according to the present invention will hereinafter be described with reference to FIG. 6. In FIG. 6, like parts corresponding to those of FIG. 1 are marked with the same references and therefore need not be described in detail.

Referring to FIG. 6, the CD player 1 is adapted to reproduce a CD on which a digital audio signal has been recorded, wherein a digital audio signal reproduced from a CD carried on the CD holder 2 is converted to an analog audio signal which is output from the analog audio signal output terminal 3, and the audio signal is reproduced from a speaker of an audio equipment (not shown) connected to this CD player 1. Also, this CD player 1 is provided with the digital signal output terminal 4, such that a digital signal reproduced from a CD is directly output from this digital signal output terminal 4. For example, by connecting this digital signal output terminal 4 with an audio equipment provided with a digital signal input terminal, an audio signal in the form of digital signal is transmitted to the amplifier side, to thereby keep deterioration in reproduced sound quality at a minimum.

This CD player 1 is provided with the infrared ray signal receiving section 5 such that a variety of reproducing controls can be performed by receiving an infrared ray signal emitted from a remote commander (not shown). For example, in a certain reproducing apparatus, a variety of controls, such as indication of a reproduction start position, a pause, a fast forward, a playback stop and so on can be performed by a track number and an index number. In other reproducing apparatus, a control of a reproducing start position can be directly performed by a command indicative of an elapsed time (minute, second and sector) from the start of the reproduction. The types of this control are different with the types of reproducing apparatus. For example, in the case of reproducing apparatus whose operation can be controlled by the track number, it is constructed in a manner that a reproduced track number is indicated by an infrared ray signal from the remote commander to start a reproduction of a music on the indicated track. Further, in the case of reproducing apparatus whose reproduction start position can be designated by the elapsed time, the command of minute, second and sector can be issued by the infrared ray signal from the remote commander. In this case, when a reproduction start position has been indicated by a track number and an index number, information on a track named TOC (Table of Contents) in the innermost periphery of a disc is read, address positions of the indicated track number and index number are determined, an optical pickup head is moved to the address positions of these track number and index number, and the location of the indicated track number and index number is reproduced.

The format of the infrared ray signal output from the remote commander is similar to that of FIG. 2, and let us explain this format one more time for understanding the third embodiment more clearly.

As shown in FIG. 2, assuming that a sequence of infrared ray signals output by an operation is one packet, this one packet has one cycle of 45 milliseconds which is repeated three times and an off-interval is composed of 150 milliseconds. In each cycle, a guide pulse (a synchronizing signal), a data code and an apparatus code are output, and the same signals are output in each cycle. In this case, a CD player is indicated by the apparatus code, and a variety of control data such as the track number, the index number and so on are transmitted by the data code.

In the case of the CD player 1, the absolute reproducing position of minute, second and sector of which can be designated directly, as shown in FIG. 5, with the infrared ray signal output from the infrared ray signal emitting section 16 of the CD ROM control apparatus 10, one packet is composed of eight cycles (one cycle is 45 milliseconds), wherein a starting code is transmitted in the first three cycles, data indicative of minute, second and sector are transmitted at each cycle of the next three cycles, and a check code and an end code are transmitted in the last two cycles.

A protocol (signal format) of the thus arranged infrared ray signal is different with the types of reproducing apparatus (mainly because of different manufacturers) even when the same control operation is performed, and FIGS. 2 and 5 illustrate one example thereof.

In the third embodiment, the digital signal output terminal 4 of this CD player 1 is connected to the CD ROM control apparatus 10, and the CD player 1 and the CD ROM control apparatus 10 constitute the CD ROM drive apparatus. This CD ROM control apparatus 10 supplies a digital signal output from the digital signal output terminal 4 of the CD player 1 to its serial-to-parallel (S/P) converter 11, and digital serial data reproduced from a disk is converted to parallel data by this serial-to-parallel converter 11. The thus converted parallel data is supplied to the descramble circuit 12. In the descramble circuit 12, reproduced data is descrambled on the basis of a control of the central control apparatus 15, and the descrambled reproduced data is supplied to the subcode detecting circuit 13 and the data memory 14 In the subcode detecting circuit 13, subcode information is detected from reproduced data supplied thereto, and the detected subcode information is supplied to the central control apparatus 15 formed of a microcomputer. Also, the operation in which the reproduced data is stored in the data memory 14 is controlled by the central control apparatus 15, and stored data is supplied to this central control apparatus 15. Further, the central control apparatus 15 is connected with the infrared ray signal emitting section 16, and a predetermined infrared ray signal is output from this infrared ray signal emitting section 16 under the control of the central control apparatus 15. In this case, the infrared ray signal emitting section 16 is placed at a position from which an emitted infrared ray signal reaches the infrared signal receiving section 5 of the above-mentioned CD player 1, and the infrared ray signal emitting section 16 of this CD ROM control apparatus 10 generates a control signal indicative of the reproducing mode of the disc.

Particularly, in the third embodiment, a control data storing section 17 is connected to the central control apparatus 15, and various infrared ray signals for controlling various CD players that are stored beforehand in this control data storing section 17. More specifically, a control signal for indicating the absolute reproducing start position by minute, second and sector and a control signal for indicating the reproducing start position by the track number and the index number are stored in the control data storing section 17 in the form of a plurality of protocols (signal formats). An infrared ray signal receiving section 18 is connected to the control data storing section 17, whereby the infrared ray signal received by the infrared ray signal receiving section 18 is stored in the control data storing section 17 by a predetermined operation.

Predetermined data stored in the data memory 14 of the CD ROM apparatus 10 is supplied to a predetermined data processing apparatus (not shown) which therefore performs various data processings.

In the thus made arrangement, when a CD ROM on which necessary data has been stored is loaded on the disc holding portion 2 of the CD player 1, the CD player 1 and the CD ROM control apparatus 10 can function as the CD ROM drive apparatus.

An operation in which the present invention is used as the CD ROM drive apparatus will be described hereinafter.

Explaining the condition that data is recorded in the CD ROM, since a CD ROM has a very large data recording capacity, a plurality of data may be recorded, wherein each data is recorded in a region corresponding to a digital audio data recording area on a CD in a similar block format to digital audio data. More specifically, showing an example of a recording format of the CD in FIG. 3, data is divided into a plurality of blocks and recorded, and 75 blocks are formed on a recording track of a one-second portion. One second in this case corresponds to the length of a one-second portion of a recording track in the case of recording digital audio signal as data. Each block is formed of 2352 bytes, wherein in each block the first 12 bytes are assigned to a synchronizing signal, and the next four bytes are assigned to a header. In this header, address information (minute, second, sector) of a recording sector and recording mode information are recorded. The next 2048 bytes are assigned to an arbitrary data recording area, four bytes subsequent to this data recording area are assigned to an error detecting code, the next eight bytes are assigned to a space, and thereafter, the last four bytes are assigned to an error correcting code. Incidentally, data except for the synchronizing signal in each block is descrambled and recorded. First predetermined bytes including the header are called the subcode, and address information included in this subcode enables a search as will be described later. The address information included in this subcode is constructed in a similar manner to the case of a CD on which digital audio signal is recorded as data.

In this example, track numbers are assigned to a recording track of a CD ROM at predetermined intervals (not limited to equal intervals), and if necessary, an index number is assigned to each track number at a predetermined location of the track, wherein address information on the track numbers is recorded on a track referred to as TOC in the innermost periphery.

An operation of reading out data thus recorded on a CD ROM will be explained. First, record address information for each data is recorded on a predetermined track of a CD ROM or on a separate floppy disk, and the central control apparatus 15 for controlling read-out operation of the CD ROM judges this data record address information, indicates an address of necessary data, and has the necessary data read out. That is, by the central control apparatus 15 of the CD ROM control apparatus 10, when predetermined data is required to be read from a CD ROM loaded on the CD player 1, an address position at which this data has been recorded is determined. In this embodiment, information of the track number and the index number including the address in which each data is recorded is included in recording address information for each data.

When the address on which necessary data have been recorded (minute, second, sector, track number and index number) has been determined, the infrared ray signal emitting portion 16 derives an infrared ray signal on the basis of a command from the central control apparatus 15. At that time, the infrared ray signal emitting portion 16 forms the infrared ray signal on the basis of control data of predetermined protocol stored in the control data storing section 17 and outputs infrared ray signals in the sequential order of control systems by which necessary data can be read out at highest speed.

Figure 7:
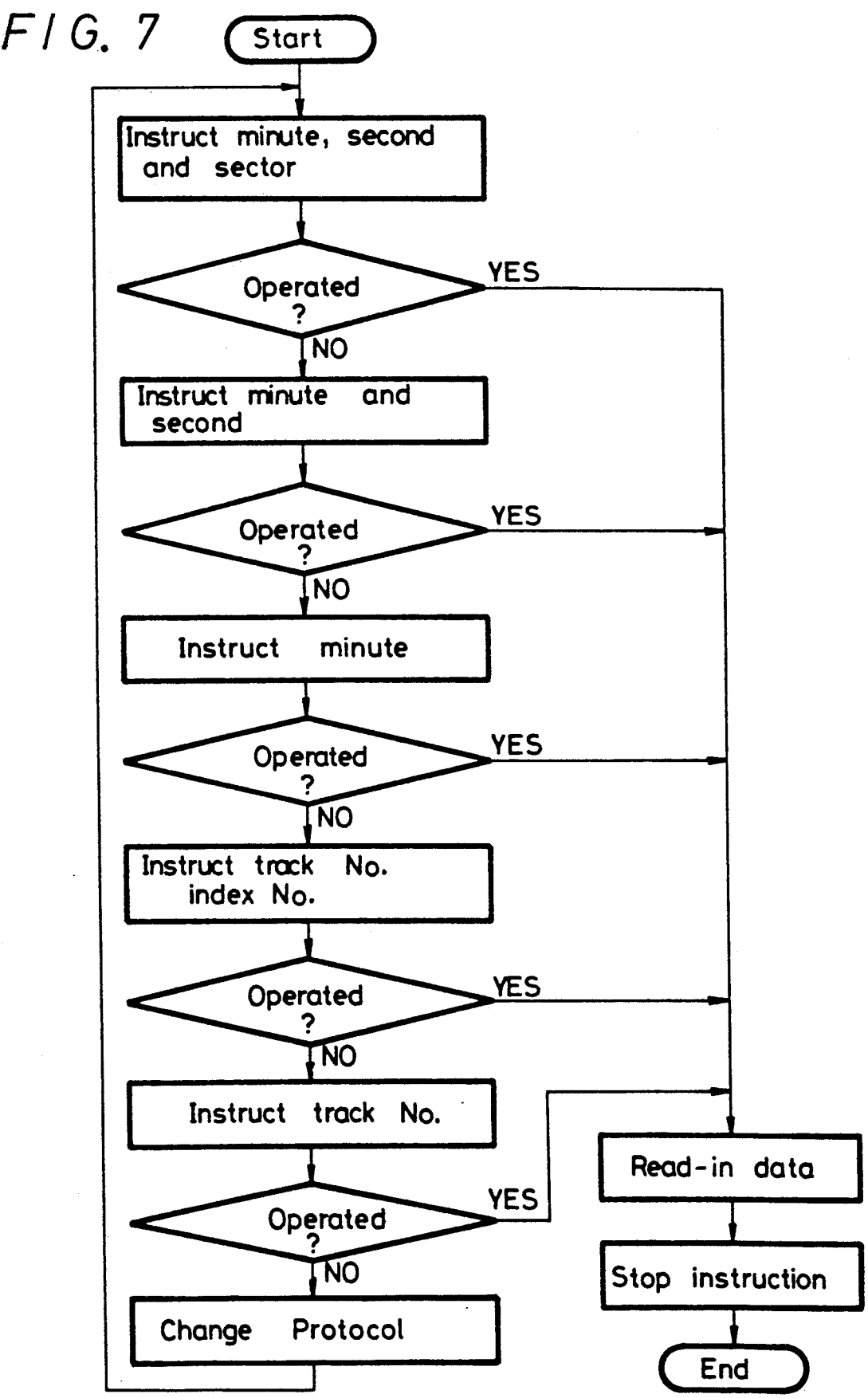
FIG. 7 is a flowchart to which references will be made in explaining an operation of the third embodiment of the invention.

As shown in a flowchart forming FIG. 7, data indicative of minute, second and sector which enables the disc to be controlled with highest accuracy is emitted from the infrared ray signal emitting section 16 as an infrared ray signal. When the infrared ray signal receiving section 5 of the CD player 1 receives the data indicative of minute, second and sector, if the CD player 1 is of such type that the reproducing position can be controlled by minute, second and sector, the optical pickup head is moved to the address of the minute, second and sector instructed to reproduce the CD from the designated position. Then, reproduced digital data output from the digital signal output terminal 4 of the CD player 1 is supplied to the CD ROM control apparatus 10.

In this CD ROM control apparatus 10, subcode information is detected from the reproduced digital data by the subcode detecting circuit 13 and the detected subcode information is supplied to the central control apparatus 15, whereby an address of a reproducing portion is checked on the basis of address information included in this subcode information. At that time, when the subcode detecting circuit 13 detects the same address as the address designated by the infrared ray signal, the central control apparatus 15 determines that the CD player 1 connected can control the reproducing position on the basis of minute, second and sector. Then, under the control of the central control apparatus 15, reproduced data at that time is descrambled by the descramble circuit 12 and stored in the data memory 14. The header of the stored data is confirmed, and if confirmed, it is determined that the read-in of the data has been correctly performed, and this data is supplied to a predetermined data processing apparatus (not shown) under the control of the central control apparatus 15 which therefore performs a predetermined operation based on the read-out data. Then, at a timing point in which data is stored in the data memory 14 correctly, a command for stopping the reproducing operation is given to the CD player 1 by the infrared ray signal and the CD player 1 stops its reproducing operation. When data is read out hereinafter, the minute, second and sector are instructed by the infrared ray signal of the protocol provided at that time.

If the same address as the address instructed by the infrared ray signal is not detected from the subcode information of the reproduced data (including a case that reproduced data is not obtained), it is determined that the CD player 1 connected is of such type which cannot be operated even when the minute, second and sector are instructed by the infrared ray signal of the protocol at that time. Then, an infrared ray signal of other control system in which a search speed is high is emitted from the infrared ray emitting portion 16. More specifically, data of the same protocol indicative of minute and second is output from the infrared ray signal emitting portion 16 as an infrared ray signal.

When the infrared ray signal receiving section 5 of the CD player 1 receives this data indicative of minute and second, if the CD player 1 is of such type that the reproducing position can be controlled by the minute and second, the optical pickup head is moved to the address of the instructed minute and second and starts the reproduction from the instructed position, whereby reproduced digital data from the digital signal output terminal 4 of the CD player 1 is supplied to the CD ROM control apparatus 10.

When the same address as the address instructed by the infrared ray signal is detected from the address information involved in the subcode information detected from the reproduced digital data in the CD ROM control apparatus 10, the central control apparatus 15 determines that the CD player 1 connected is of such type that the reproducing position can be controlled by the minute and second. Thus, after the sector on which necessary data has been recorded is reproduced, under the control of the central control apparatus 15, reproduced data at that time is descrambled by the descramble circuit 12 and stored in the data memory 14. After the header is confirmed, this data is supplied to the predetermined data processing apparatus (not shown) under the control of the central control apparatus 15, whereby the predetermined data processing apparatus performs a predetermined operation based on the read-out data. At a timing point in which data is stored correctly, the CD player 1 is commanded to stop its reproducing operation by the infrared ray signal and the reproduction operation thereof is stopped. When data is read out hereinafter, the minute and second are instructed by the infrared ray signal of the protocol provided at that time.

If the same address as the address instructed by the infrared ray signal is not detected from the subcode information of the reproduced data (including a case that reproduced data is not obtained), it is determined that the CD player 1 connected is of such type that it cannot be operated even when the minute and second are instructed by the infrared ray signal of the protocol provided at that time. Then, an infrared ray signal of other control system in which a search speed is high is output. To be more concrete, data of the same protocol indicative of minute is output from the infrared ray signal emitting section 16 as an infrared ray signal. When the infrared ray signal receiving section 5 of the CD player 1 receives the data indicative of minute, if the CD player 1 is of such type that the reproducing position thereof can be controlled by the minute, the optical pickup head is moved to the address of the minute instructed and the reproduction operation is started from the instructed position, whereby reproduced digital data output from the digital signal output terminal 4 of the CD player 1 is supplied to the CD ROM control apparatus 10.

When the same address as the address instructed by the infrared ray signal is detected from the address information involved in the subcode information detected from the reproduced digital data in the CD ROM control apparatus 10, the central control apparatus 15 determines that the CD player 1 connected is of such type that the reproducing position thereof can be controlled by the minute. Then, after the address of second and sector on which necessary data has been recorded is reproduced, under the control of the central control apparatus 15, reproduced data at that time is descrambled by the descramble circuit 12 and stored in the data memory 14. After the header is confirmed, this data is supplied to the predetermined data processing apparatus (not shown) under the control of the central control apparatus 15 and a predetermined operation is performed on the basis of the read-out data. Then, at a timing point in which data is stored correctly, a command for stopping the reproducing operation is given to the CD player 1 through the infrared ray signal and the reproducing operation is stopped. When data is read out hereinafter, the minute is instructed by the infrared ray signal of the protocol provided at that time.

If the same address as the address instructed by the infrared ray signal is not detected from the subcode information of the reproduced data (including a case that reproduced data is not obtained), it is determined that the CD player 1 connected is of such type which cannot be operated even when the minute is instructed by the infrared ray signal of the protocol provided at that time. Then, an infrared ray signal of other control system in which a search speed is high is output. That is, data of the same protocol indicative of track number and index number is emitted from the infrared ray signal emitting section 16 as an infrared ray signal. When the infrared ray signal receiving section 5 of the CD player 1 receives data indicative of track number and index number, if the CD player 1 is of such type in which the reproducing position can be controlled on the basis of track number and index number, the optical pickup head is moved to the address of the track number which is instructed on the basis of information of TOC track. Also, the index signal in the track of the index track number are searched and counted from its head by the number instructed by the index number, and the reproduction is started from the position at which the count value coincides with the index number, whereby reproduced digital data from the digital signal output terminal 4 of the CD player 1 is supplied to the CD ROM apparatus 10.

When addresses of track number and index number instructed by the infrared ray signal are detected from address information involved in the subcode information detected from the reproduced digital data in the CD ROM apparatus 10, it is determined by the central control apparatus 15 that the playback position of the CD player 1 connected can be controlled on the basis of the track number and the index number. Then, after the reproduction proceeds to the address at which the necessary data is recorded, under the control of the central control apparatus 12, data reproduced at that time is descrambled by the descramble circuit 12 and read in the data memory 14. After the header is confirmed, this data is supplied to a predetermined data processing apparatus (not shown) under the control of the central control apparatus 15 and the data processing apparatus performs the predetermined operation on the basis of the read-out data. At time point in when the data is read in correctly, a reproduction stop command is supplied to the CD player 1 by the infrared ray signal and the reproduction operation of the CD player 1 is stopped. When the data is read out from now on, according to the protocol at that time, the track number and the index number are taught by the infrared ray signal.

When an address the same as the address instructed by the infrared ray signal cannot be detected from the subcode information of the reproduced data (including the case that the reproduced data cannot be obtained), it is determined that the CD player 1 connected is of the type such that it cannot be operated by the track number and the index number instructed by the infrared ray signal of the protocol at that time. Therefore, an infrared ray signal of other control system is output. In other words, data of the same protocol and which shows only the track number is output from the infrared ray signal emitting section 16 as an infrared ray signal. When the infrared ray signal receiving section 5 of the CD player 1 receives the data indicative of the track number, if the CD player 1 is of the type such that the reproduction position thereof can be controlled by the track number, the optical pickup head is moved to the position of the address of the track number instructed on the basis of the information of the TOC track and the data is reproduced from that position. Then, the reproduced digital data from the digital signal output terminal 4 of the CD player 1 is fed to the CD ROM control apparatus 10.

When the address of the track number instructed by the infrared ray signal is detected from the address information involved in the subcode information detected from the reproduced digital data by the CD ROM control apparatus 10, it is determined by the central control apparatus 15 that the CD player 1 connected is of the type such that the reproduction position thereof can be controlled by the track number. Then, after the reproduction proceeds to the address in which necessary data is recorded, under the control of the central control apparatus 15, reproduced data at that time is descrambled by the descramble circuit 12 and is read in the data memory 14. After the header is confirmed, this data is supplied to the predetermined data processing apparatus under the control of the central control apparatus 15, whereby the predetermined operation is carried out on the basis of the read-out data. Then, at the time point when the data can be read in correctly, the reproduction operation stop command is supplied to the CD player 1 by the infrared ray signal and the reproduction operation of the CD player 1 is stopped. When data is read out from now on, the track number at that time is instructed by the infrared ray signal according to the protocol at that time.

When the address the same as the address instructed by the infrared ray signal cannot be detected from the subcode information of the reproduced data (including the case such that reproduced data is not obtained), it is determined that the CD player 1 connected is of the type such that it cannot be operated even if the track number is instructed by the infrared ray signal of the protocol at that time. If the CD player 1 connected is not operated at all, all operations of minute, second, sector, track number and index number according to the same protocol are disabled and it is considered that the CD player 1 connected is of the type such that it can be operated by an infrared ray signal of some other protocol (signal format). Accordingly, a control signal of some other protocol stored in the control data storage section 17 is read out to the central control apparatus 15, and on the basis of the control signal of the read-out protocol, the instruction of minute, second and sector, the instruction of minute and second, the instruction of minute, the instruction of the track number and the index number and the instruction of the track number are sequentially performed by the infrared ray signals. If the CD player 1 connected is operated by the infrared ray signal of any one of the above-mentioned instructions, then data is read out by the infrared ray signal of the protocol and the control system at that time is used from then on.

If the CD player 1 connected is not operated at all by the infrared ray signals of the respective control systems of the protocol at that time, then a control signal of some other protocol is further read out from the control data storage section 17, and the above-mentioned instructions are sequentially performed by the infrared ray signals of the respective control signals on the basis of the control signals of the read-out protocols. These operations are repeated until the protocol and the infrared ray signal of the control system by which the CD player 1 connected is operated.

When the CD player 1 is not operated by the infrared ray signals of any of the protocols stored in the control data storage section 17, a remote commander belonging to this CD player 1 is operated to output various kinds of infrared ray control signal such as minute, second, sector, track number, index number and so on toward the infrared ray signal receiving section 18 of the CD ROM control apparatus 10 whereby these infrared ray control signals are stored in the control data storage section 17. Then, on the basis of the signal systems stored, the central control apparatus 15 generates infrared ray signals which are output from the infrared ray emitting section 16.

As described above, according to this embodiment, data can be read out from the CD ROM by utilizing the digital audio signal reproducing CD player 1. In that case, since necessary data recording areas are searched by utilizing various search functions effected by the infrared ray signals from the remote commander prepared for the standard CD player 1, the special search function for reading-out data is not needed and hence, various CD players available on the market can be utilized as the disk drive apparatus of the CD ROM apparatus.

In this embodiment, since the search operation of the necessary data recording area is arranged such that control systems which can be operated by the CD player 1 connected are sequentially searched and the earliest control system can be automatically determined, data are automatically searched while the control ability of the CD player 1 is demonstrated as much as possible. Further, since infrared ray signals of a plurality of protocols are sequentially output, the infrared ray signals can be suitably applied to CD players of various kinds of protocols with the result that the kinds of CD players connected are not limited. Furthermore, if the protocol of the infrared ray signal of the CD player connected is not stored in the control data storage section 17, then the corresponding signal is stored in the control data storage section 17 by utilizing the infrared ray signal receiving section 18, thereby coping with the above-mentioned disadvantage.

While the infrared ray signal of other protocol is transmitted after the infrared ray signals of respective control systems of the same protocol are sequentially transmitted as shown in the flow chart of FIG. 7 in the above-mentioned embodiment, the infrared ray signal is transmitted by the control system that can be searched earliest while only the protocols are sequentially changed and then the infrared ray signal is transmitted by the control system that can be searched next while only the protocols are sequentially changed. While in the above embodiment, the CD ROM apparatus is made, the present invention is not limited thereto and can be applied to a ROM apparatus by utilizing a digital audio signal recording area of the video disk. In that case, instead of the CD player, a video disk player having a digital audio signal output terminal may be connected to the CD ROM apparatus 10. If such video disk player is connected to the CD ROM apparatus 10, the search operations at the unit of minute, second and frame (one frame is a thirtieth of a second) are possible so that the search operation for obtaining necessary data can be effected at high speed. Furthermore, the present invention can be applied to other digital signal reproducing apparatus such as a digital audio tape recorder and so on.

As set forth above, according to the third embodiment, since various reproducing apparatus such as a digital audio signal reproducing CD player whose reproducing condition can be controlled by way of wireless transmission of infrared rays or the like are employed as the digital data reproducing apparatus which reproduces computer program data or the like, the digital data reproducing apparatus can be made inexpensive by utilizing the existing apparatus. In that case, since the control system or the protocol used to reproduce the position in which necessary data is recorded by means of the wireless signal is sequentially changed, data reproducing apparatus of various control systems and various protocols can be utilized as the digital data reproducing apparatus. Also, since the controllable systems are sequentially searched for in the earliest order, the search of data can be automatically performed while the control ability of the reproducing apparatus connected is demonstrated as much as possible.

Figure 8:
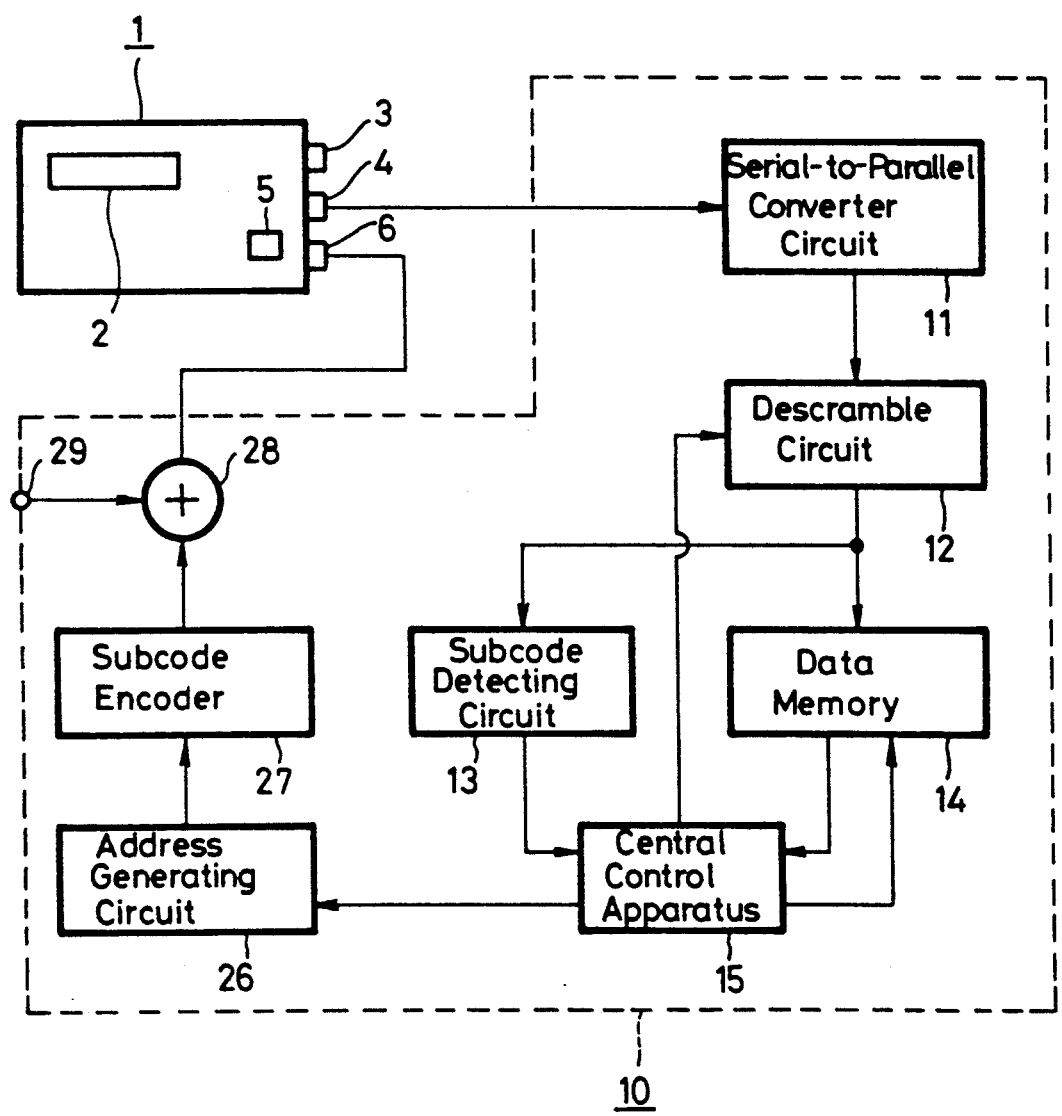
FIG. 8 is a block diagram showing a fourth embodiment of the data reproducing apparatus according to the present invention.

A fourth embodiment of the data reproducing apparatus according to the present invention will hereinafter be described with reference to FIG. 8. In FIG. 8, like parts corresponding to those of FIG. 6 are marked with the same references and therefore need not be described in detail.

Referring to FIG. 8 the CD recording and reproducing apparatus 1 is adapted to reproduce the CD in which the digital audio signal is recorded and to record the digital audio signal on the CD. The digital audio signal reproduced from the CD held on the CD carrying section 2 is converted into the analog audio signal and this analog audio signal is delivered through the analog audio signal output terminal 3, whereby the audio signal is reproduced from a speaker of an audio appliance (not shown) connected to this CD recording and reproducing apparatus 1.

Further, this CD recording and reproducing apparatus 1 is provided with the digital signal output terminal 4 and the digital signal reproduced from the CD is directly delivered through this digital signal output terminal 4. For example, this digital signal output terminal 4 is connected to an audio appliance having a digital signal input terminal, whereby the audio signal is transmitted to the amplifier side in the form of the digital signal, thus deterioration of the quality of the reproduced sound is suppressed to the minimum.

This CD recording and reproducing apparatus 1 is provided with the infrared ray signal receiving section 5 and various reproduction modes can be controlled by receiving the infrared ray signal emitted from the remote commander.

Further, this CD recording and reproducing apparatus 1 is provided with a digital signal input terminal 6, and the digital audio signal supplied to this digital signal input terminal 6 can be recorded on a predetermined recording disc. Furthermore, by an information of a predetermined format supplied to the digital signal input terminal 6, the CD recording and reproducing apparatus 1 can be controlled in various manners. By way of example, by supplying address information converted into digital data to the digital signal input terminal 6 from the outside, an address on the disc and which is instructed by the address information can be reproduced. In that case, this address information is converted into data by the format similar to that of subcode data recorded on the CD and is fed to the digital signal input terminal 6.

In this embodiment, the digital signal output terminal 4 of the CD recording and reproducing apparatus 1 is connected to the CD ROM control apparatus 10, and the CD recording apparatus and the CD ROM control apparatus 10 constitute the CD ROM drive apparatus. In the CD ROM control apparatus 10, the digital signal from the digital signal output terminal 4 of the CD recording and reproducing apparatus 1 is supplied to the serial-to-parallel converter 11, and digital serial data reproduced from the disc is converted into parallel data by the serial-to-parallel converter 11. The thus converted parallel data is fed to the descramble circuit 12. In the descramble circuit 12, the reproduced data is descrambled on the basis of the control of the central control apparatus 15, and the descrambled reproduced data is supplied to the subcode detecting circuit 13 and the data memory 14. In the subcode detecting circuit 13, a subcode information is detected from the reproduced data supplied thereto, and the detected subcode information is supplied to the central control apparatus 15 which is formed of the microcomputer. The writing of reproduced data in the data memory 14 is controlled by the central control apparatus 15, and the thus stored data is fed to the central control apparatus 15.

The central control apparatus 15 is connected with an address generating circuit 26, and this address generating circuit 26 generates a predetermined address signal under the control of the central control apparatus 15. In that case, the address generating circuit 26 is a circuit by which an address information is converted into data according to the format similar to that of the subcode data recorded in the CD. The address signal generated by the address generating circuit 26 is encoded by a subcode encoder 27 in a predetermined manner and the thus encoded digital signal is supplied to a mixer 28.

In FIG. 8, reference numeral 29 designates a recording digital data input terminal. Digital data (digital audio signal or the like) supplied to the recording digital data input terminal 29 is supplied to the mixer 28, in which the subcode data supplied thereto from the subcode encoder 27 and the recording digital data are mixed together. Output data from the mixer 28 is supplied to the digital signal input terminal 6 of the CD recording and reproducing apparatus 1.

Then, the predetermined data read out from the CD recording and reproducing apparatus 1 and stored in the data memory 14 of the CD ROM control apparatus 10 is supplied to a predetermined data processing apparatus (not shown) which performs various data processings.

In accordance with the above-mentioned arrangement, the CD ROM in which necessary data are stored is held on the disc carrying section 2 of the CD recording and reproducing apparatus 1, whereby the CD recording and reproducing apparatus 1 and the CD ROM control apparatus 10 are able to function as the CD ROM drive apparatus.

An operation of the data reproducing apparatus shown in FIG. 8 will be described next, in which case the data reproducing apparatus of the present invention is utilized as the CD ROM drive apparatus.

The data recording state of the CD ROM will be explained first. Since the data recording capacity of the CD ROM is very large, a plurality of data are stored in the CD ROM, and each data is recorded on the CD at its position corresponding to the digital audio data recording area in the form of a block arrangement similar to that of the digital audio data. In that case, the recording format of the CD ROM is the same as that shown in FIG. 3 and therefore need not be explained herein.

Figure 9:
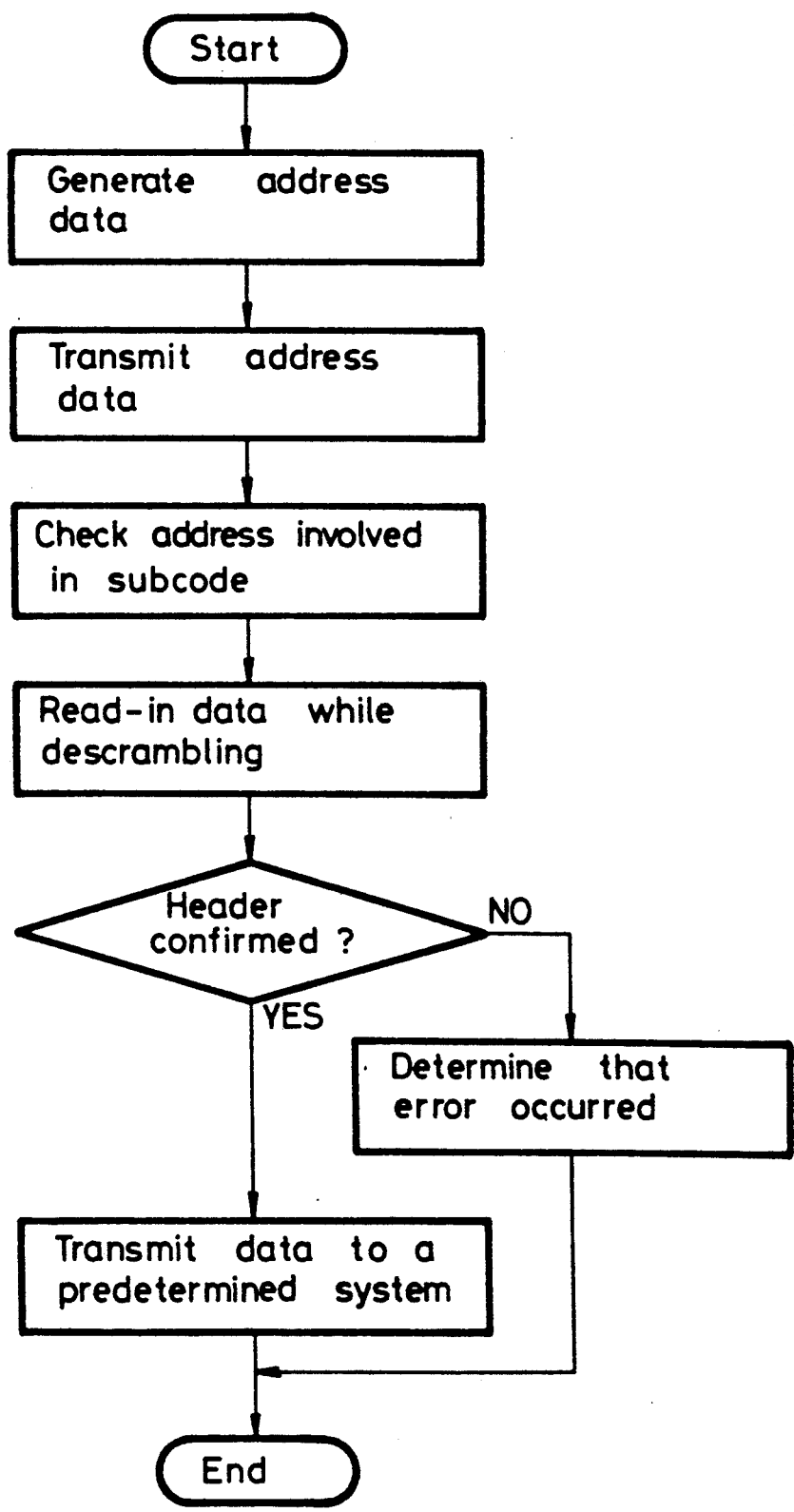
FIG. 9 is a flowchart to which references will be made in explaining an operation of the fourth embodiment of the present invention.

Then, an operation in which the data recorded on the CD ROM is read out will be explained with reference to a flowchart forming FIG. 9.

The recording address information of each data is recorded on the CD ROM at its predetermined track or on another floppy disk. Then, the central control apparatus 15 which controls the read-out of the CD ROM judges the data recording address information and instructs the address of necessary data so that necessary data is read out from the CD ROM. More specifically, when predetermined data must be read out from the CD ROM held on the CD recording and reproducing apparatus 1, the central control apparatus 15 of the CD ROM apparatus 10 judges the address (minute, second and sector) in which this data is recorded, as shown in the flowchart of FIG. 9.

If the recording address is determined, on the basis of the instruction issued by the central control apparatus 15, data of the determined address is generated by the address generating circuit 26. Then, the thus generated address data is encoded into subcode data by the subcode encoder 27 and is transmitted to the CD recording and reproducing apparatus 1 through the digital signal input terminal 6.

When this address data is supplied to the CD recording and reproducing apparatus 1, the control section of the CD recording and reproducing apparatus 1 moves the optical pickup head to the address (minute, second and sector) instructed on the basis of the address information recorded on the subcode area of the disc and causes the optical pickup head to reproduce the corresponding position on the disc. In other words, the optical pickup head reproduces the disc at its portion in which the subcode, which provides the same address information as the address information supplied from the CD ROM control apparatus 10.

When the portion of the address instructed is reproduced as described above, all reproduced digital data are output from the digital signal output terminal 4 of the CD recording and reproducing apparatus 1 and the reproduced digital data is supplied to the CD ROM control apparatus 10. In the CD ROM control apparatus 10, the subcode information is detected from the reproduced digital data by the subcode detecting circuit 13, and the detected subcode information is supplied to the central control apparatus 15, whereby the address of the reproduced portion is checked on the basis of the address information involved in this subcode information. Simultaneously, the parity check is performed. Then, it is determined whether the address of the reproduced portion is the recording address sector) of the necessary data or not.

When the address of the sector in which the necessary data is recorded is detected, under the control of the central control apparatus 15, reproduced data at that time is descrambled by the descramble circuit 12 and read in the data memory 14. Then, a header of the thus read-in data is confirmed, and if the header is confirmed, it is determined that the read-in of the data can be carried out correctly. Then, this data is supplied to the predetermined data processing apparatus (not shown) under the control of the central control apparatus 15, whereby the predetermined operation is carried out on the basis of the read-out data. When the data is read into the data memory 14 correctly, data instructing the stop of the reproduction operation is transmitted through the digital signal input terminal 6 to the CD recording and reproducing apparatus 1 so that the reproducing operation of the CD recording and reproducing apparatus 1 is stopped. Further, if the header of the thus read-in data is not confirmed, it is determined that the data was not correctly read into the data memory 14, and the address is again instructed by the transmission of the address information. If the data cannot be read in the data memory 14 correctly after the control operation is performed a plurality of times, an indication of the abnormal condition is displayed.

As described above, according to this embodiment, the data can be read out from the CD ROM by utilizing the CD recording and reproducing apparatus 1 which records and reproduces the digital audio signal. In that case, since the control information used to search the necessary data recording area is supplied to the CD recording and reproducing apparatus 1 via the digital signal input terminal 6 of the CD recording and reproducing apparatus 1, special search function for reading-out the data is not needed, and various kinds of CD recording and reproducing apparatus can be utilized as the disc drive apparatus of the CD ROM apparatus.

While in the above embodiment is directed to the CD ROM apparatus, the present invention is not limited thereto and can be applied to a ROM apparatus in which a digital audio signal recording area of the video disc is employed. In that case, instead of the CD recording and reproducing apparatus, a video disc recording and reproducing apparatus having digital audio signal input and output terminals may be connected to the CD ROM control apparatus 10. Further, other digital signal recording and reproducing apparatus such as a digital audio tape recorder and so on may be utilized.

According to the fourth embodiment of the present invention, various reproducing apparatus such as the digital audio signal reproducing CD recording and reproducing apparatus can be utilized as the digital data reproducing apparatus which reproduces computer program data or the like, thus the digital data reproducing apparatus being constructed by utilizing the existing apparatus. In that case, if the absolute position information in which necessary data is recorded is transmitted in the form of digital data to thereby reproduce the necessary data, the necessary data can be obtained immediately. Therefore, the data can be read out at high speed equal to or higher than that of the exclusive digital data reproducing apparatus.

A fifth embodiment of the data reproducing apparatus according to the present invention will be explained hereinafter. In this embodiment, the data reproducing apparatus of the present invention is applied to a video disk reproducing apparatus.

Figure 10:
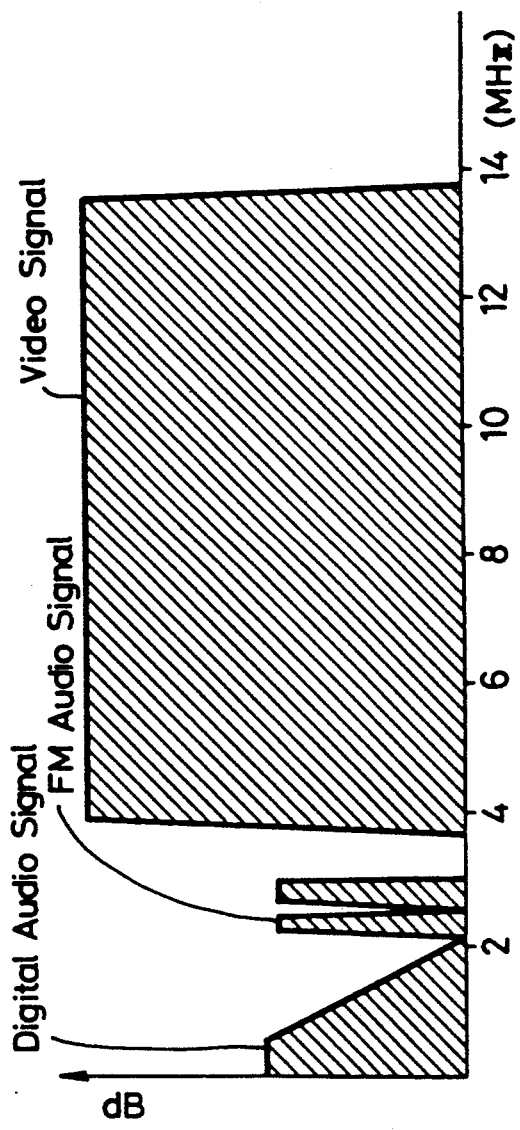
FIG. 10 is a diagram of the frequency spectrum of signals of a video disc, and to which references will be made in explaining a fifth embodiment of the data reproducing apparatus according to the present invention.

Conventionally, it is proposed that various digital data are recorded in the video disc in which the digital audio signal can be recorded similarly to the CD so that the video disc can be utilized as a video disc ROM apparatus. More specifically, as shown in FIG. 10, an audio signal FM-modulated to the band lower than the video signal recording band is recorded in the video disc and an audio signal digitally converted to the lower band is also recorded therein. This digitally converted audio signal has the same content as that of the FM-modulated audio signal and the digital signal having the format substantially the same as the recording format of the CD is recorded. When the data reproducing apparatus is employed as the above-mentioned video disc ROM apparatus, various digital data are recorded instead of the digital audio signal.

Figure 11:
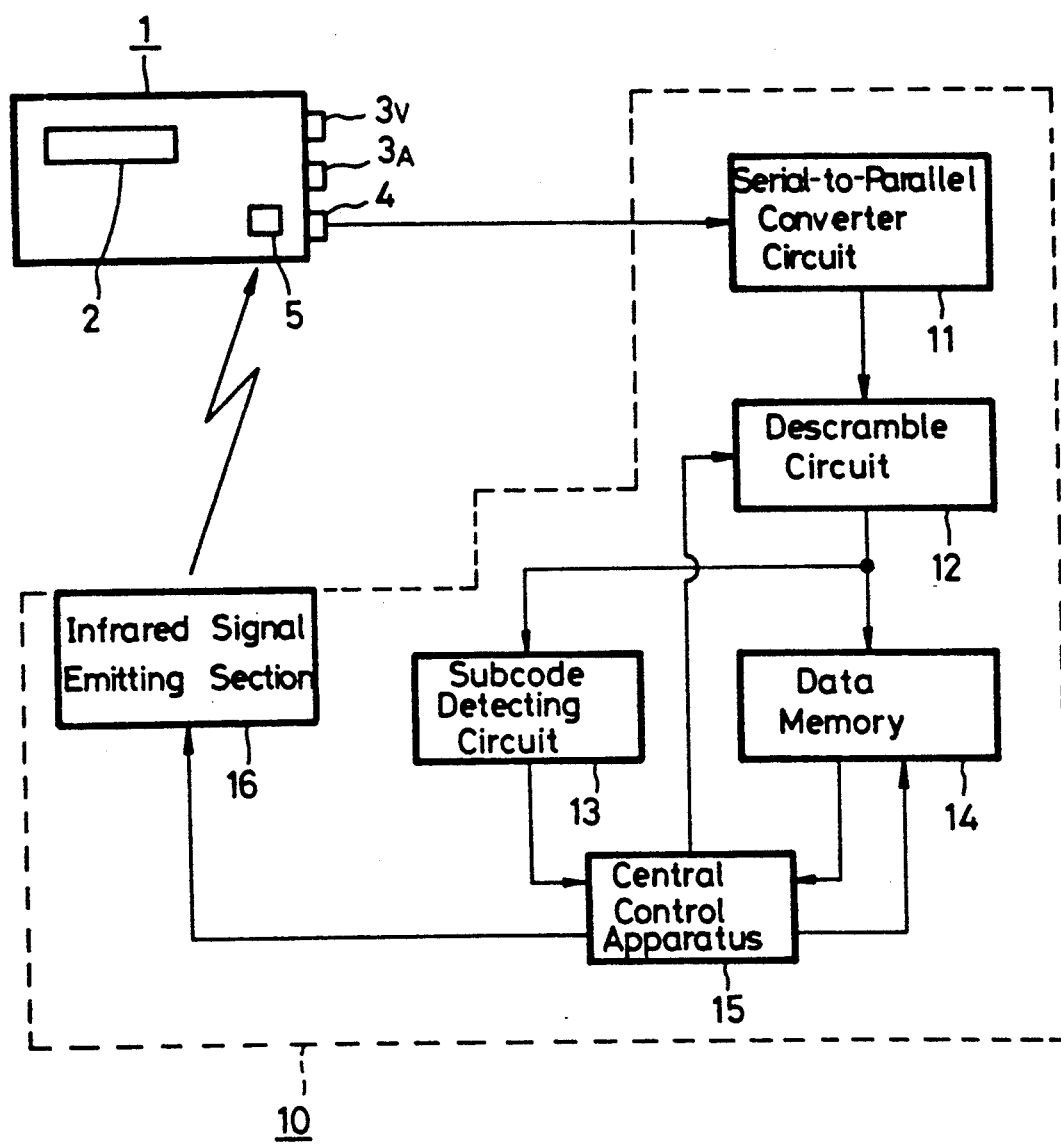
FIG. 11 is a block diagram showing the fifth embodiment of the data reproducing apparatus according to the present invention.

An arrangement of the fifth embodiment of the data reproducing apparatus according to the present invention will hereinafter be explained with reference to FIG. 11. In FIG. 11, like parts corresponding to those of FIG. 6 are marked with the same references and therefore need not be described in detail.

As shown in FIG. 11, the video disc player 1 is adapted to reproduce the video disc in which the video signal and the analog audio signal or the digital audio signal is recorded. The video signal reproduced from the video disc held on the video disc carrying section 2 is output from an video signal output terminal 3V, and the reproduced digital audio signal is converted into the analog audio signal and delivered through an analog audio signal output terminal 3A, thereby fed to a video apparatus (not shown) connected to the video disc player 1. Alternatively, the analog audio signal reproduced instead of the digital audio signal and which is recorded in the form of FM-modulated signal is output from the analog audio signal output terminal 3A.

This video disc player 1 is provided with the digital signal output terminal 4, and the digital audio signal reproduced from the video disc is directly output from this digital signal output terminal 4. For example, when this digital output terminal 4 is connected to the audio apparatus having the digital signal input terminal, the audio signal is transmitted to the amplifier side in the form of the digital signal, thus the deterioration of the quality of the reproduced sound being suppressed to the minimum.

This video disc player 1 is provided with the infrared ray signal receiving section 5 and various kinds of reproduction modes can be controlled by receiving the infrared ray signals emitted from the remote commander (not shown). To be more concrete, the standard reproduction controls such as start of reproduction, pause mode, fast forward, reproduction stop mode and so on can be performed by the infrared ray signal. If the video disc is a CAV disc (disc rotated at a constant angular velocity), the reproducing track in the units of minute, second and frame number instructed by the minute, second and the frame number can be searched by the infrared ray signal, whereas if the video disc is a CLV disc (disc rotated at a constant linear velocity), the reproduction track in the units of minute and second instructed by the instruction of minute and second can be searched by the infrared ray signal. In that case, when the reproduction start position by the minute, second and frame number or by the minute and second is instructed, the instructed position on the disc is searched for on the basis of the frame number, code or the like recorded in the vertical blanking period of the video signal or the like, and the optical pickup head is moved to the searched address to thereby reproduce the disc at its position instructed.

In this embodiment, the digital signal output terminal 4 of the video disc player 1 is connected to the CD ROM control apparatus 10, and the video disc player 1 and the video disc ROM control apparatus 10 constitute the video disc ROM drive apparatus. In the video disc ROM control apparatus 10, the digital signal reproduced from the digital audio signal recording area and delivered from the digital signal output terminal 4 of the video disc player 1 is supplied to the serial-to-parallel converter 11, and digital serial data reproduced from the disc is converted into parallel data by the serial-to-parallel converter 11. The thus converted parallel data is fed to the descramble circuit 12. In the descramble circuit 12, the reproduced data is descrambled on the basis of the control of the central control apparatus 15, and the descrambled reproduced data is supplied to the subcode detecting circuit 13 and the data memory 14. In the subcode detecting circuit 13, a subcode information is detected from the reproduced data supplied thereto, and the detected subcode information is supplied to the central control apparatus 15 which is formed of the microcomputer. The writing of reproduced data in the data memory 14 is controlled by the central control apparatus 15, and the thus stored data is fed to the central control apparatus 15.

The central control apparatus 15 is connected with an infrared ray signal emitting section 16, and the infrared ray signal emitting section 16 emits a predetermined infrared ray signal under the control of the central control apparatus 15. In that case, the infrared ray signal emitting section 16 is located at the position such that the infrared ray signal therefrom is reached to the infrared ray signal receiving section 5 of the video disc player 1. The infrared ray signal emitting section 16 of the video disc ROM control apparatus 10 outputs control signals of minute, second and frame or minute, second or the like to instruct the reproducing track (video track) on the disc.

Then, predetermined data stored in the data memory 14 of the video disc ROM control apparatus 10 is supplied to a predetermined data processing apparatus (not shown) which processes various data.

In accordance with the above-mentioned arrangement, the video disc ROM in which the necessary data are stored is loaded onto the disc carrying section 2 of the video disc player 1, whereby the video disc player 1 and the video disc ROM control apparatus 10 are enabled to function as a video disc ROM drive apparatus.

An operation of the data reproducing apparatus shown in FIG. 11 will be described next, in which case the data reproducing apparatus invention is utilized as the video disc ROM drive apparatus.

The data recording state of the video disc ROM will be explained first. Since the data recording capacity of the video disc ROM is very large, a plurality of data are stored in the video disc ROM, and each data is recorded on the video disc at its position corresponding to the digital audio data recording area in the form of a block arrangement similar to that of the digital audio data. In that case, the recording format of the video disc ROM is the same as that shown in FIG. 3 and therefore need not be explained herein.

Then, an operation in which the data recorded on the video disc ROM is read out will be explained with reference to a flowchart forming FIG. 12.

The recording address information of each data is recorded in the video disc ROM at its predetermined track or on another floppy disk. Then, the central control apparatus 15 which controls the read-out of the video disc ROM judges the data recording address information and instructs the address of necessary data so that necessary data is read out from the video disc ROM. More specifically, when predetermined data must be read out from the video disc ROM held on the video disc player 1, the central control apparatus 15 of the video disc ROM apparatus 10 determines the address position at which the necessary data is recorded. In the video disc player 1 of this embodiment, it is possible to instruct the playback start position by the information of minute, second and frame number (in the case of the CAV disc) or the information of minute and second (in the case of the CLV disc)sector) recorded in the condition of being multiplexed with the video signal. Therefore, the information of minute, second and frame number or minute and second of the video image corresponding to the address in which respective data are recorded are involved in the recording address information of respective data.

If the determination of this address is finished, then by the instruction of the central control apparatus 15, the infrared ray signal emitting section 16 is actuated to output address data which instruct minute, second and frame number or minute and second of the video track as shown in the flowchart of FIG. 12. When this address data is received by the infrared ray signal receiving section 5 of the video disc player 1, the control section of this video disc player 1 detects the video track instructed on the basis of the address information recorded together with the video signal on the video disc and moves the optical pickup head to the instructed track.

When the track instructed as described above is reproduced, all reproduced digital data recorded in the digital audio signal recording area are output from the digital signal output terminal 4 of the video disc player 1, and the reproduced digital data is supplied to the video disc ROM control apparatus 10. In the video disc ROM control apparatus 10, the subcode information is detected from the reproduced digital data by the subcode detecting circuit 13, and the detected subcode information is supplied to the central control apparatus 15, whereby the address of the reproduced portion is checked on the basis of the address information involved in this subcode information. Simultaneously, the parity check is performed. Then, it is determined whether the address of the reproduced portion detected is the recording address (sector) of the necessary data or not. If the address is not the address of the corresponding sector, the reproduction is continuously carried out until the address of the corresponding sector is detected.

When the address of the sector in which the necessary data is recorded is detected, under the control of the central control apparatus 15, reproduced data at that time is descrambled by the descramble circuit 12 and read in the data memory 14. Then, a header of the thus read-in data is confirmed, and if the header is confirmed, it is determined that the read-in of the data can be carried out correctly. Then, this data is supplied to the predetermined data processing apparatus (not shown) under the control of the central control apparatus 15, whereby the predetermined operation is carried out on the basis of the read-out data. When the data is read into the data memory 14 correctly, data instructing the stop of the reproduction operation is transmitted to the video disc player 1 through the infrared ray signal. Thus, the reproducing operation of the video disc player 1 is stopped. Further, if the header of the thus read-in data is not confirmed, it is determined that the data is not correctly read in the data memory 14, and the address is again instructed by the transmission of the infrared ray signal. If the data cannot be read in the data memory 14 correctly after the control, operation is performed a plurality of times, an indication of the abnormal condition is displayed.

As described above, according to this embodiment, the data can be read out from the video disc ROM by utilizing the video disc player 1 which reproduces the digital audio signal together with the video signal. In that case, since the necessary data recording area is searched for by utilizing the search function in which the video track is searched for by the infrared ray signal derived from the remote commander of the standard video disc player 1, any special search function used to read out data is not required and various kinds of video disc players available on the market can be utilized as the disc drive apparatus of the video disc ROM apparatus.

According to the fifth embodiment of the present invention, various video reproducing apparatus such as the video disc player for recording the digital audio signal together with the video signal or the like can be utilized as the digital data reproducing apparatus which reproduces computer program data or the like and the digital data reproducing apparatus can be made inexpensive by using the existing apparatus. In that case, since necessary data is reproduced by transmitting the address information of the video track corresponding to the position in which the necessary data is recorded to the reproducing section in a wireless fashion, the necessary data can be obtained immediately by utilizing the search function which is generally prepared in the reproducing apparatus in order to reproduce the picture, and hence, data can be read out at speed equal to or higher than that of an exclusive digital data reproducing apparatus.

A sixth embodiment of the data reproducing apparatus according to the present invention will be explained hereinafter.

In this embodiment, the present invention is applied to the CD ROM disc in which various digital data such as program data or the like are recorded on a disc which is standardized similarly to the compact disc (CD) in which the digital audio signal is recorded. The data recorded condition of the CD ROM will be explained first.

Since the data storage capacity of the CD ROM is very large, a plurality of data are recorded in the CD ROM. In that case, each data is recorded in the CD ROM at its position corresponding to the digital audio data recording area of the CD in the form of a block arrangement similar to the digital audio data, similarly as described hereinbefore with reference to FIG. 3.

In this embodiment, the track number and index number are assigned to the recording track of the CD ROM at equal time interval. More specifically, in the case of the CD in which the digital audio signal is recorded as data, 99 track numbers from 1 to 99 can be set in one disc, and 99 index numbers from 1 to 99 can be set in the track of each track number. Similarly, in the CD ROM disc of this embodiment, 99 track numbers from 1 to 99 can be assigned and set in one disc at an equal time interval, and 99 index numbers from 1 to 99 are set in the track of each track number at an equal time interval. In that case, the address information of the track number is recorded in the innermost track which might be called a TOC (table of contents).

With the above-mentioned arrangement, assuming that digital audio data of 74 minutes can be recorded, for example, on one disc, 75 sectors are determined in one second in the case of the CD ROM. Therefore, the number of all sectors in one disc is expressed as $$74 \text{ minutes} \times 60 \times 75 = 33,000 \text{ sectors}$$

In this case, the setting of 99 track numbers and 99 index numbers yields $333,000 \div (99 \times 99) = 34$ sectors. Accordingly, about 34 sectors can be arranged in the index of one unit. In actual practice, numbers of powers of 2 are suitable for the data processing and therefore, 32 sectors, for example, are determined.

In this case, if information of track number and index number of each data are involved in the data recording address information, the track number and the index number are determined on the basis of this information. When only the absolute position information (minute, second and sector) of each data is recorded in the data recording address information, the track numbers and the index numbers are set at the equal time interval in this embodiment, whereby a predetermined track on the disc is reproduced to detect the number of sectors existing in the index of one unit. Then, on the basis of the detected data, the absolute position information of minute, second and sector are changed into the track number and the index number. The changed data are stored in the disc from now on. When the changed data are stored in the predetermined track of the disc beforehand, the changed data are read out therefrom and the absolute position informations of the minute, second and sector are changed into the track number and the index number.

The arrangements of the CD player 1 and the CD ROM control apparatus 10 are substantially the same as those of FIG. 1 and therefore need not be described herein.

According to the sixth embodiment of the present invention, various reproducing apparatus such as a digital audio signal reproducing CD player whose reproduction state can be controlled by the wireless transmission of infrared rays or the like can be utilized as the digital data reproducing apparatus which reproduces computer program data or the like, and therefore the digital data reproducing apparatus can be made inexpensive by utilizing the existing apparatus. In that case, since the track search position signals such as the track number, index number and so on are assigned and set at the equal time interval, the absolute position informations such as minute, second, sector and so on can be changed into the track search position signals. Thus, the absolute position at which necessary data is stored can be searched immediately by utilizing the track search position signal and the necessary data can be obtained without delay. Therefore, data can be read out at speed equal to or higher than that of the exclusive digital data reproducing apparatus.

A seventh embodiment of the data reproducing apparatus according to the present invention will hereinafter be described with reference to FIG. 13. In FIG. 13, like parts corresponding to those of FIGS. 1, 6 and so on are marked with the same references and therefore need not be described in detail.

Particularly, in this embodiment, the digital output terminal 4 of the CD player 1 is connected to a data processing apparatus 30, and the CD player 1 and the data processing apparatus 30 constitute a data processing system. This data processing apparatus 30 is a general-purpose computer wherein a central control apparatus (or central processing unit, i.e. CPU) 32, a random access memory (RAM) 33 or the like are connected to a bus line 31. In this embodiment, the digital signal output from the digital signal output terminal 4 of the CD player 1 is supplied to a decoder 34. This decoder 34 is formed as an adaptor type together with a software program memory 35 which will be described later. In this decoder 34, digital serial data reproduced from the disc is converted into parallel data according to a method based on a predetermined format. At that time, reproduced data is descrambled or the like if necessary. The thus converted parallel data is supplied through the bus line 31 to the RAM 33 and is stored in the RAM 33 under the control of the central control apparatus 32.

The bus line 31 of this data processing apparatus 30 is connected with the software program memory 35, and the central control apparatus 32 processes reproduced data on the basis of the program stored in the software program memory 35. More specifically, the central control apparatus 32 reads out the program stored in the software program memory 35 and the central control apparatus 32 processes the reproduced data stored in the RAM 33 by a method instructed by the read-out program. Specific software programs stored in the software program memory 35 might be, for example, file structured software, file operating system, computer emulation program and so on. In this embodiment, the software program memory 35 is constructed as an adaptor 30a which is detachably provided in the data processing apparatus 30 and the above-mentioned decoder 34 is also integrally formed with the adaptor 30a, whereby the software program memory 35 and the decoder 34 can be exchanged in the form of one unit.

The data processing apparatus 30 of this embodiment is provided with an infrared ray signal emitting section 36, and when predetermined control data is supplied from the central control apparatus 32 through the bus line 31 to the infrared ray signal emitting section 36, the infrared ray signal emitting section 36 outputs a predetermined infrared ray signal. In that case, the infrared ray signal emitting section 36 is located at the position such that the infrared ray signal emitted therefrom reaches the infrared ray signal receiving section 5 of the above-mentioned CD player 1. Then, from the infrared ray signal emitting section 36 of the data processing apparatus 30, the control signals such as the track number, index number and so on to instruct the reproduced track of the disc are output in the condition shown in FIG. 2.

The predetermined data stored in the RAM 33 of the data processing apparatus 30 is supplied to a predetermined data processing section (not shown) which performs various processing operations on the basis of the reproduced data. In this embodiment, a video control circuit 37 and an audio control circuit 38 are connected to the bus line 31 of the data processing apparatus 30, whereby video and audio signals based on the data stored in the RAM 33 are fed to a video signal output terminal 41 and an audio signal output terminal 42 connected to the video control circuit 37 and the audio control circuit 38, respectively.

An operation of the data processing apparatus 30 of this embodiment will be described hereinafter.

In this embodiment, the CD ROM in which necessary data are stored is loaded on the disc carrying section 2 of the CD player 1 and an adaptor (i.e. adaptor which stores therein programs so that the decoder 34 decodes the reproduced data of the CD ROM and the program for controlling the CD ROM is stored in the memory 35) corresponding to the CD ROM is connected to the data processing apparatus 30 as the adaptor 30a. Therefore, the CD player 1 is utilized as the CD ROM drive apparatus. An operation in which the data reproducing apparatus is utilized as the CD ROM drive apparatus will be described below.

Figure 3:
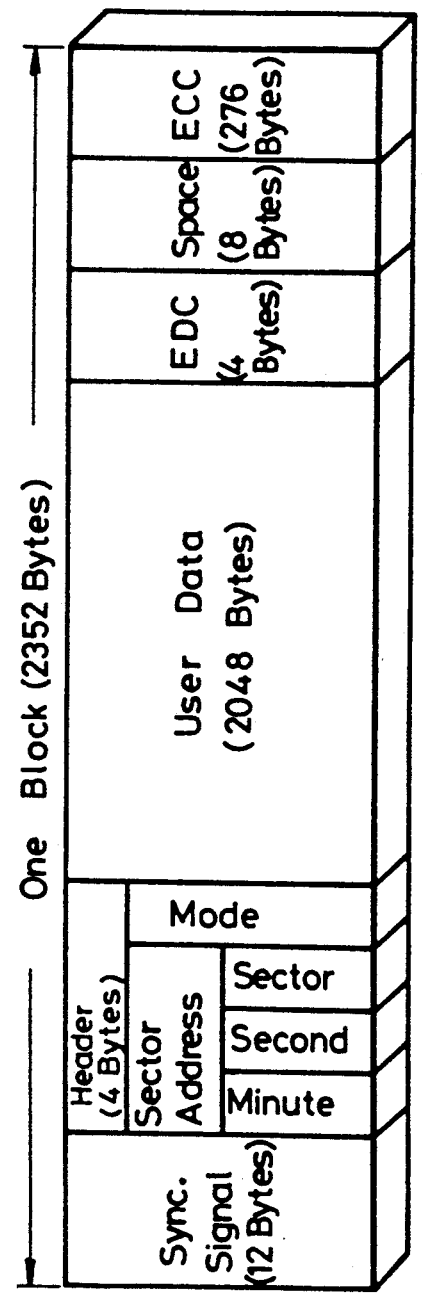
FIG. 3 is a schematic diagram of a data format of a CD-ROM, and to which references will be made in explaining the present invention.

In this case, the data recording state of the CD ROM is substantially the same as that of FIG. 3 and therefore need not be described herein.

In this embodiment, the track numbers are assigned to the recording tracks of the CD ROM at an arbitrary interval (this interval is not always an equal interval). If necessary, the index numbers are assigned to predetermined positions of the tracks of respective track numbers and the address information of the track number is recorded on the innermost track called the TOC.

An operation in which data recorded on the CD ROM is read out will be described first.

Recording address informations of respective data are recorded on the CD ROM at its predetermined tracks or recorded on another record medium (floppy disk, etc.). Then, the central control apparatus 32 judges the data recording address information in accordance with the program stored in the software program memory 35 and instructs the address of necessary data, thus the necessary data being read out from the CD ROM. More specifically, when the predetermined data must be read out from the CD ROM held on the CD player 1 by the central control apparatus 32 of the data processing apparatus 30, the position of the address in which such data is recorded is determined initially. The CD player 1 of this embodiment can instruct the reproduction start position by the track number and the index number, so that the information of the track number and the index number involving the address in which each data is recorded are involved in the recording address information of respective data.

If the judgement of the track number and the index number is finished, under the instruction of the central control apparatus 32 in accordance with the program stored in the software program memory 35, track number data is output from the infrared ray signal emitting section 36. If the track number data is received by the infrared ray signal receiving section 5 of the CD player 1, then the control section of the CD player 1 moves the optical pickup head to the address of the track number instructed on the basis of the address information of the track number recorded on the TOC track. When the index number must be instructed, the infrared ray signal emitting section 36 outputs index number data successively. If the index number data is received by the infrared ray signal receiving section 5 of the CD player 1, then the CD player 1 searches for the track of the number at which the optical pickup head is located at present time from the beginning thereof to thereby count the number of index signals. Then, the CD player 1 determines whether or not the count value coincides with the value of the instructed index number. The CD player 1 continues this search operation until the count value coincides with the value of the instructed index number. If the count value becomes coincident with the value of the instructed index number, the CD player 1 determines that the index number is the target index number and reproduces the track of this index number.

When the position of the instructed track number and the index number is reproduced, all reproduced digital data are output from the digital signal output terminal 4 of the CD player 1, and reproduced digital data is supplied to the data processing apparatus 30. In the data processing apparatus 30, a subcode information is detected from the reproduced digital data to check the address of the reproduced position on the basis of the detected subcode information. Simultaneously, the parity check is performed. Then, it is determined whether or not the detected address of the reproduced position is the recording address (sector) of the necessary data. If the detected address is not the address of the corresponding sector, the reproduction is continuously carried out until the address of the corresponding sector is detected.

If the address of the sector in which the necessary data is recorded is detected, under the control of the central control apparatus 32 in accordance with the program stored in the software program memory 35, reproduced data at that time is temporarily stored in the RAM 33, fed to the video control circuit 37, the audio control circuit 38 and the like, whereby video and audio signals based, for example, on the reproduced data are fed to the output terminals 41 and 42, respectively.

As described above, according to this embodiment, the data can be read out from the CD ROM by utilizing the digital audio signal reproducing CD player 1. In that case, since the necessary data recording area is searched for by utilizing the search function of track number and the index number based on the infrared ray signal from the remote commander (not shown) of the standard CD player 1, no special search function for reading out the data is required so that various kinds of CD players now available on the market can be utilized as the disc drive apparatus of the CD ROM apparatus.

In this embodiment, since the decoder 34 and the software program memory 35 provided in the data processing apparatus 30 are integrally formed as the independent adaptor 30a, a general-purpose computer can be utilized as the data processing apparatus 30. More specifically, since the program for controlling the CD ROM is stored in the memory 35 side and is set in the decoder 34 so that the reproduced data from the CD ROM is decoded, if the program or the like for controlling the CD ROM is not set in the data processing apparatus 30 beforehand, the data processing apparatus 30 can be operated as the CD ROM control apparatus by connecting the adaptor 30a. Accordingly, it becomes possible to utilize various kinds of general-purpose computer apparatus as the CD ROM control apparatus. Further, if the adaptor 30a is exchanged to other adaptor, a data reproducing apparatus having a different signal format can be utilized as the CD player 1.

While the CD ROM apparatus is constructed in the above-mentioned embodiment, the present invention can be applied to a ROM apparatus which utilizes a digital audio signal recording area of the video disc. In that case, instead of the CD player, a video disc player having the digital audio signal output terminal may be connected to the CD ROM control apparatus 30.

Furthermore, other digital signal reproducing apparatus such as a digital audio tape recorder and so on may be utilized.

As set forth above, according to the seventh embodiment of the present invention, the decoder and the software program memory section of the reproducing decoder are detachably provided so that, if the decoder and the memory section are exchanged, data recorded according to various signal formats can be read out from the digital data reproducing section and processed by the digital data processing section. Therefore, the digital data reproducing apparatus such as the audio signal reproducing CD player and various kinds of general-purpose computer apparatus can be utilized to process reproduced data from the CD ROM or the like.

Having described preferred embodiments of the invention with reference to the accompanying drawings, it is to be understood that the invention is not limited to those precise embodiments and that various changes and modifications thereof could be effected by one skilled in the art without departing from the spirit or scope of the novel concepts of the invention as defined in the appended claims.

I claim as my invention:

1. A data reproducing apparatus comprising:
  a reproducing section for reproducing digital data and having an infrared signal input for receiving an infrared control signal, in which a reproducing state is controlled by an infrared control signal transmitted in a wireless fashion, so that reproduced data is output as digital data in response thereto; and
  a control section connected to receive the digital data from the reproducing section and having an infrared signal emitting section for transmitting the infrared control signal including reproducing position information to said infrared signal input of said reproducing section in a wireless fashion, said control section decoding the digital data from said reproducing section and memory means for storing a necessary potion of decoded digital data from said means for decoding, wherein track number information near the position in which said necessary portion of data is recorded is transmitted from said infrared signal emitting section to said reproducing section by the infrared control signal to thereby reproduce said necessary portion of data.

2. A data reproducing apparatus comprising:
  a reproducing section for reproducing digital data from a record medium and having an infrared signal input for receiving an infrared control signal, in which a reproducing state is controlled by an infrared control signal transmitted in a wireless fashion, so that reproduced data is output as digital data in response thereto; and
  a control section connected to receive the digital data from the reproducing section and having an infrared signal emitting section for transmitting the infrared control signal including reproducing position information to said infrared signal input of said reproducing section in a wireless fashion, having means for decoding the digital data from said reproducing section, and having memory means for storing a necessary portion of said data in said control section, wherein absolute position information where said necessary portion of said data is recorded on the record medium is transmitted from said infrared signal emitting section to said reproducing section by the infrared control signal to thereby reproduce said necessary portion of data.

3. A data reproducing apparatus comprising:
  a reproducing section for reproducing digital data from a record medium and having an infrared signal input for receiving an infrared control signal, in which a reproducing state is controlled by an infrared control signal transmitted in a wireless fashion to thereby output reproduced data as digital data in response thereto; and
  a control section connected to receive the digital data from the reproducing section and having an infrared emitting section for transmitting the infrared control signal including reproducing position information to said reproducing section in a wireless fashion, having descramble circuit means for decoding the digital data from said reproducing section, and storing a selected position of said data in said control section, wherein an information signal for reproducing a position of said record medium in which said selected data is recorded is transmitted as said infrared control signal from said infrared emitting section to said reproducing section through a wireless signal in a sequential order of earlier search times, a control signal for reproducing said selected data is stored in said control section and an information signal of the stored control signal is utilized to search following data.

4. A data reproducing apparatus comprising:
  a reproducing section for reproducing digital data from a record medium and having an infrared signal input for receiving an infrared control signal, in which a reproducing state is controlled by an infrared control signal transmitted in a wireless fashion to thereby output reproduced data as digital data in response thereto; and
  a control section connected to receive the digital data from the reproducing section and having an infrared signal emitting section for transmitting the infrared control signal including a reproducing position information signal to said reproducing section in a wireless fashion and decoding the digital data from said reproducing section and storing necessary data in said control section, wherein an storing necessary data in said control section, wherein an information signal for reproducing a position of said record medium in which necessary data is recorded is transmitted from said control section to said reproducing section through a wireless signal in the sequential order of a plurality of control signal formats each having the same meaning, the control signal format control signal format is utilized to search subsequent data.

5. A data reproducing apparatus comprising:

a reproducing section for reproducing digital data multiplexed on a video signal and recorded on a record medium and outputting said reproduced data as digital data, wherein a reproduction condition thereof is controlled by an infrared control signal transmitted in a wireless fashion to an infrared signal input; and a control section connected to receive said digital data from said reproducing section and having an infrared signal emitting section for transmitting a reproducing position information signal to said infrared signal input of said reproducing section in a wireless fashion and decoding said digital data supplied from said reproducing section, determining that at least some of said data is necessary data, and storing said necessary data in said control section, wherein address information of the video signal multiplexed at the position in which said necessary data is recorded on the record medium is transmitted by the infrared control signal from said infrared signal emitting section to said reproducing section to thereby reproducing a recording position of said necessary data.

6. A data processing system comprising:

digital data reproducing section having an infrared signal input for receiving an infrared control signal and for outputting reproduced data as digital data in response thereto;

a decoder for decoding digital data output from said digital data reproducing section;

a digital data processing section for processing the digital data decoded by said decoder in a predetermined manner;

an infrared signal emitting section for transmitting the infrared control signal to said infrared signal input of said digital data reproducing section; and a memory section for storing therein a program which operates said decoder and said digital data processing section, wherein said decoder and said memory section are made independent from said digital data reproducing section, said digital data processing section, and said infrared signal emitting section and are made freely detachable therefrom, said program providing data to said infra-red signal emitting section for producing said infrared control signal.

* * * * *

UNITED STATES PATENT AND TRADEMARK OFFICE
CERTIFICATE OF CORRECTION

PATENT NO. : 5,257,254
DATED : October 26, 1993
INVENTOR(S) : Ken Kutaragi

It is certified that error appears in the above-indentified patent and that said Letters Patent is hereby corrected as shown below:

```
Col.  3, line  6, delete "its"
Col.  5, line  6, change "players" to --player--
Col. 18, line 13, change "sector)" to --(sector)--
         line 52, delete "in"
Col. 22, line 24, delete ","
Col. 23, line 28, change "33,000" to --333,000--
         line 31, change "333, 000" to --333,000--
         line 53, change"informations" to --information--

Col. 27, line 54, change "potion" to --portion--
Col. 28, lines 57 & 58, delete "wherein an storing
         necessary data in said control section,"
Col. 29, line 23, change "reproducing" to --reproduce--
```

Signed and Sealed this

Thirteenth Day of June, 1995

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,257,254
DATED : October 26, 1993
INVENTOR(S) : Ken Kutaragi

It is certified that error appears in the above-identified patent and that said Letters Patent is hereby corrected as shown below:

Column 3,
Line 6, delete "its"

Column 5,
Line 6, change "players" to --player--

Column 18,
Line13, change "sector)" to --(sector)--
Line 52, delete "in"

Column 22,
Line 24, delete ","

Column 23,
Line 28, change "33,000" to --333,000--
line 31, change "333, 000" to --333,000--
Line 53, change"informations" to --information--

In the Claims

Column 27,
Line 54, change "potion" to --portion--

Column 28,
Lines 57 & 58, delete "wherein an storing necessary data in said control section,"

Claim 4, column 28,
Line 66, delete "control signal format" second occurrence.

UNITED STATES PATENT AND TRADEMARK OFFICE
CERTIFICATE OF CORRECTION

PATENT NO. : 5,257,254
DATED : October 26, 1993
INVENTOR(S) : Ken Kutaragi

It is certified that error appears in the above-identified patent and that said Letters Patent is hereby corrected as shown below:

Column 29,
Line 23, change "reproducing" to --reproduce--

Signed and Sealed this

Tenth Day of July, 2001

*Attest:*

*Nicholas P. Godici*

*Attesting Officer*

NICHOLAS P. GODICI
*Acting Director of the United States Patent and Trademark Office*